US007185557B2

(12) United States Patent
Venettozzi

(10) Patent No.: US 7,185,557 B2
(45) Date of Patent: Mar. 6, 2007

(54) EPITROCHOIDAL CRANKSHAFT MECHANISM AND METHOD

(76) Inventor: Thomas Mark Venettozzi, 6747 Highway 99, Molino, FL (US) 32577

( * ) Notice: Subject to any disclaimer, the term of this patent is extended or adjusted under 35 U.S.C. 154(b) by 368 days.

(21) Appl. No.: 10/879,875

(22) Filed: Jun. 29, 2004

(65) Prior Publication Data
US 2006/0053964 A1 Mar. 16, 2006

(51) Int. Cl.
*F16C 11/00* (2006.01)
(52) U.S. Cl. .......................................... 74/602; 74/595
(58) Field of Classification Search ................. 74/440, 74/579 R, 595, 600, 602; 123/197.1, 197.3
See application file for complete search history.

(56) References Cited

U.S. PATENT DOCUMENTS

| | | | |
|---|---|---|---|
| 858,433 A | 7/1907 | Wright | |
| 892,795 A | 7/1908 | Baldwin | |
| 1,309,917 A | 7/1919 | Ianaka | |
| 1,476,309 A | 12/1923 | Toth | |
| 1,553,009 A | 9/1925 | Stuke | |
| 1,715,368 A | 6/1929 | Jausaud | |
| 2,199,625 A | 5/1940 | Fiala-Fernbragg | |
| 2,390,228 A | 12/1945 | Thompson | |
| 2,390,229 A | 12/1945 | Thompson | |
| 3,686,972 A | 8/1972 | McWhorter | |
| 3,744,941 A | 7/1973 | Nestor | |
| 3,861,239 A | 1/1975 | McWhorter | |
| 3,875,905 A | 4/1975 | Duquette | |
| 3,886,805 A | 6/1975 | Koderman | |
| 4,073,196 A | 2/1978 | Dell | |
| 4,152,955 A | 5/1979 | McWhorter | |
| 4,174,684 A | 11/1979 | Roseby | |
| 4,211,190 A | 7/1980 | Indech | |
| 4,223,568 A | 9/1980 | Brems | |
| 4,485,768 A | 12/1984 | Heniges | |
| 4,517,931 A | 5/1985 | Nelson | |
| 4,535,730 A | 8/1985 | Allen | |
| 4,576,060 A | 3/1986 | Gristina | |
| 4,848,170 A | 7/1989 | Inagaki | |
| 5,060,603 A | 10/1991 | Williams | |
| 5,067,456 A | 11/1991 | Beachley | |
| 5,158,047 A | 10/1992 | Schaal | |
| 5,322,425 A | 6/1994 | Adiwinata | |
| 5,890,465 A * | 4/1999 | Williams | 123/197.4 |
| 5,927,236 A | 7/1999 | Gonzalez | |
| 6,289,857 B1 | 9/2001 | Boggs | |
| 6,453,869 B1 | 9/2002 | Moore | |
| 6,526,935 B2 * | 3/2003 | Shaw | 123/197.4 |
| 6,732,683 B2 * | 5/2004 | Weiss | 123/48 B |
| 6,976,467 B2 * | 12/2005 | Fantuzzi | 123/197.1 |

* cited by examiner

*Primary Examiner*—David Morgan Fenstermacher
(74) *Attorney, Agent, or Firm*—Juan J. Lizarraga

(57) ABSTRACT

This invention relates to a mechanism and method for enhancing the performance of both two stroke and four stroke cycle reciprocating piston internal combustion engines, reciprocating piston pumps and compressors by generating an Epitrochoidal path of travel for the lower end of the connecting rod. The piston, attached to the upper end of the connecting rod, will be made to dwell at the lower part of its travel, enhancing the output of the engine, pump or compressor through better utilization of the available cylinder pressure.

50 Claims, 16 Drawing Sheets

EPITROCHOIDAL CRANKSHAFT MECHANISM AND METHOD

FIELD OF THE INVENTION

This invention relates to a mechanism and method for enhancing the performance of reciprocating piston internal combustion engines, pumps, and compressors by utilizing a crankshaft that generates an Epitrochoidal path. The piston will be made to dwell at the lower part of its travel, enhancing the cylinder output of the engine, pump or compressor through better utilization of available pressure.

BACKGROUND OF THE INVENTION

Since the development of the first commercially successful internal combustion engine in the 1860's by Otto and Langen, there have been constant attempts to improve the internal combustion engine. The results of those attempts are apparent everywhere and the internal combustion engine is common throughout the world and used in countless applications, including but not limited to transportation, power generation, construction, agriculture, recreational vehicles, and garden implements, to name a few. In addition to multiple applications, internal combustion engines are available for a variety of fuels, including diesel, gasoline and natural gas.

Although there are several other types of internal combustion engines such as the gas turbine and rotary, the most common type is the reciprocating piston engine. This engine operates in a cycle with four phases: intake, compression, power (expansion), and exhaust. The piston travels between a Top Dead Center position (hereafter abbreviated as "TDC"), which denotes its highest point of travel, and a Bottom Dead Center position (hereafter abbreviated as "BDC"), which denotes it lowest point of travel. The distance the piston travels between TDC and BDC is a fixed distance, and is commonly referred to as the stroke of the piston. This type of engine is either a two-stroke cycle or a four-stroke cycle. A two-stroke cycle engine requires two piston strokes (or one full revolution of the crankshaft) to complete all phases of operation, while the four-stroke cycle engine requires four piston strokes (or two full revolutions of the crankshaft) to complete all phases of its operation. Separation of each phase of operation is not a distinct division from the other phases. Time, in the form of crankshaft angle of rotation, is 'borrowed' from each of the phases such that each phase is transitioned into the next by overlapping or, in the case of the two-stroke cycle engines, combining phases.

In the typical reciprocating piston engine, the piston travels in a cylinder bore or cylindrical housing between TDC and BDC, and a connecting rod joins the piston to a crankpin on the crankshaft. The crankpin is located a set distance from the centerline of the crankshaft. In this typical configuration, the path of the crankpin as the crankshaft rotates is a circle, and the diameter of the circle is identical to the stroke value. The various parameters within this configuration such as piston diameter and stroke (determined by the crankpin location) can be changed but the basic linkage remains the same. Attempts to enhance an internal combustion engine within this configuration have been limited to some extent by the physical and mechanical properties of the materials used to construct the engine, as well as the thermodynamic properties of the fuel and its delivery into the cylinder.

There have been attempts to modify the basic linkage described above by altering the crankshaft action, varying the stroke, or changing the Compression Ratio (hereafter abbreviated as "CR"). For example, Moore U.S. Pat. No. 6,453,869 sought to increase efficiency by extending the piston dwell point at TDC and improving connecting rod leverage through a crankshaft provided with an eccentric member. Shaw U.S. Pat. No. 6,526,935 sought to increase fuel efficiency and torque by having the orbiting crankshafts trace a heart shaped pattern and providing means to adjust the CR during operation. In Gonzales U.S. Pat. No. 5,927,236, it is claimed that thermo-efficiency of an internal combustion engine was increased by varying the stroke length and imposing a larger expansion stroke and a shorter intake stroke. Schaal U.S. Pat. No. 5,158,047 claims to increase net engine efficiency by decreasing piston velocity in the first half of the power stroke by allowing more time for cylinder pressure to increase.

The unrealized advantages associated with the previous attempts have been overcome by the present invention. In contrast to previous attempts to alter the crankshaft action by extending piston dwell at TDC, the present invention maximizes piston dwell at BDC. Although there have been many attempts to cause a piston to dwell at or near TDC, or to maximize the leverage that acts to turn the crankshaft, it would appear that such a dwell should allow the fuel mixture trapped within the combustion chamber to more fully burn and reach a higher initial pressure while the available volume is small. An increased leverage or moment arm, caused by the geometry of the engine components and combined with this increased pressure, should result in more force acting to rotate the crankshaft and result in increased torque output from the engine. However, there are several reasons why these advantages cannot be realized.

A piston that dwells at or near TDC causes the fuel mixture (or air in a diesel) to preheat before the ignition phase is initiated by the introduction of a spark or fuel. All surfaces within the engine are heated by the combustion of the fuel mixture from previous power strokes, and the newly inducted fuel mixture absorbs some of this heat, in addition to the heat produced during the compression cycle. Heating the fuel mixture prior to having it trapped within the cylinder reduces its density, which means less fuel mixture is ultimately trapped for compression and power production. Detonation of the fuel mixture during this dwell period is very likely and would force the lowering of the CR to a point where engine efficiency would suffer. In order for a piston to be held at or near its TDC position while the crankshaft continues to rotate and build leverage, particularly after the combustion process has been initiated, considerable force must be applied to the piston. The rising cylinder pressure, combined with the available leverage, would tend to force the piston down the cylinder bore, which would apply a force to the crankshaft that would attempt to rotate the crankshaft in the opposite direction than intended. Until the piston is traveling down in the cylinder bore, all effort to hold it at or near TDC is against the intended direction of rotation. The net result of this negative effort is a reduction in the engine's output.

Dwell of the piston at or near TDC requires a considerable amount of crankshaft rotation to be committed to this effort and, since time is elapsing, less time and crankshaft rotation will be available to complete the other phases of engine operation. Time consumed at or near TDC results in less time being available to push the piston down the bore, scavenge the exhaust gases from the cylinder, and/or to refill the cylinder with the next fuel mixture. Without sufficient time to separate and accomplish these individual events completely, the engine's efficiency will suffer due to the overlapping of the required events, and some mixing of exhaust residue with the fresh fuel mixture will result.

Holding the piston at or near TDC while the crankshaft continues to rotate results in an increase in the lever arm on the crankshaft. Intuitively, an increased lever arm would seem to allow more torque or rotational force to be transmitted to the crankshaft with the same amount of force applied. However, such is not the case in the referenced attempts.

Viewed idealistically, the output of an internal combustion engine during a single power phase is dependant on only two variables that affect a piston of specific area: 1) The force derived from the pressure the burning fuel mixture produces within the cylinder, and 2) the distance that that pressure pushes the piston down the cylinder bore before being vented. Once the pressure within the cylinder is released, the power phase ends, even though the piston continues to travel down the cylinder bore to BDC. If the variables of force and distance remain unchanged, the total torque output of the power phase will always be the same, regardless of the crankshaft design or configuration employed. When advantages are claimed from increasing the dwell of the piston at or near TDC, there is no mention of the loss of time that the engine will suffer in getting the next fuel mixture into the cylinder. In a similar manner, claims of increases in leverage or moment arm fail to mention that on a per-degree basis, the pressure above the piston's crown falls at a more rapid rate, destroying any potential torque gains. The increased leverage causes the piston to move a greater distance for every degree of crankshaft rotation, which increases the trapped volume within the cylinder. This lowers the pressure within the cylinder and results in a loss of force to act on the increased moment arm. The total amount of torque applied to the crankshaft over the duration of the entire power phase will be no greater than the amount of torque produced by a conventional style of crankshaft. Therefore, any increases in engine output must be gained through increasing the work done on the piston, yet prior attempts that altered crankshaft motion were unable to achieve this result.

Work done on the piston is calculated by using the formula for work, which is as follows:

Work=Force×Distance

The inventive crankshaft is able to increase the work done on the piston through gains in cylinder force (pressure× piston area) and travel (distance.)

Using this formula in the context of a piston driven engine, the work done on a single piston is the product of the force provided by the pressure produced from the heat of fuel combustion acting on the crown of the piston and the distance the piston travels in its bore while that pressure acts on it. While the formula and the concept are fairly straightforward to understand, the accurate depiction of the work produced involves some detailed analysis. For instance, the pressure produced within a combustion chamber and cylinder bore varies directly with the volume of that cylinder space. If the piston is at the beginning point of its travel away from TDC at the beginning of the power phase, the pressure is high due to the minimum combustion space above it. As the pressure acts on the piston's crown and causes it to move down the bore, the volume within the combustion space and cylinder increases due to the displacement of the piston. This in turn lowers the pressure within the combustion space considerably. At some point in the travel of the piston, the exhaust phase is initiated, either by the piston uncovering an exhaust port or by an exhaust valve opening. Through either mechanism, an escape path for the trapped pressure is provided. As soon as the exhaust port or valve is opened, the force driving the piston down the cylinder bore is diverted out of the cylinder and the work done on the piston comes to an end. It must be remembered that the piston continues to move to the end of its full travel (to BDC) with no force acting to push it further down its bore. Work on the piston is no longer being performed.

Since the pressure within the cylinder is changing with the piston movement, the force acting on the piston's crown is also changing. Therefore, a single value for force cannot be directly entered into the work formula. However, the force within the cylinder can be calculated at various points along the piston's travel, based on the cylinder volume at those points and the initial starting pressure. The total distance traveled by the piston while acted upon by cylinder pressure is then summed at each point (this can also be found through integration.) In other words, the volume above the piston crown can be accurately calculated by the use of simple geometry and knowing the piston's position in the cylinder, and the resulting pressure found through the application of Boyle's law. This simplified view does not address thermodynamic considerations, but the example is relevant in this application.

There are several advantages to extending piston dwell at BDC. The piston will reach TDC quicker than an engine with a similar stroke and operating at a similar rate of speed, allowing less time for the trapped fuel mixture to absorb heat from the surrounding surfaces and preheat. This will tend to ward off the undesirable condition of detonation, and it will then be possible to raise the CR to attain more efficiency.

Ignition timing is usually set to occur at some point as the piston is still approaching TDC during the compression stroke. Typically, a spark is introduced in the cylinder at a point in the crankshaft rotation before TDC (hereafter abbreviated as "BTDC"), which, through geometry, can be equated to a distance that the piston is away from its TDC position. This is done to enable the spark to ignite the fuel mixture while the cylinder pressure is rising due to compression. Time is required to achieve a complete burn to occur, but the rate of burn is also influenced by the rate of pressure rise within the cylinder. If the piston is dwelling at BDC, it will be moving a greater distance per degree of crankshaft rotation during the rise to the top of the cylinder bore. If the spark is to occur at the same distance from TDC as in a standard engine, through geometry it can be seen that the number of crankshaft degrees before the piston reaches TDC will be less. The rate of pressure rise will be greater than in a standard engine, so the ignition phase can be made to occur at fewer degrees of crankshaft rotation before TDC. This will lessen the negative work done on the piston, which will tend to rotate the engine in the opposite direction than intended, and the net result will be a greater power output.

By allowing the piston to recede away from TDC quickly, there is considerably less time for the heat from the combustion of the fuel mixture to soak into the surrounding surfaces. The heat retained within the combustion gases is more fully utilized to produce pressure to act upon the piston's crown. Since less heat is deposited within the surrounding cylinder surfaces, the next inducted fuel mixture charge will have a cooler environment to enter into, resulting in a denser fuel charge, promoting efficient combustion and greater engine output.

By maximizing the piston dwell at or near BDC, the piston will travel to the bottom region of the bore in less time than a conventional engine or one that has its piston dwell at or near TDC could accomplish. This will occur when all engine designs are rotating at the same rate, generating the same number of Revolutions Per Minute (hereafter abbreviated as "RPM".) In the engine that has its piston dwell at or near BDC, there will be an increased amount of time that the piston will be at the bottom of the piston stroke. Therefore, the piston can be moved a greater distance down the cylinder bore with pressure above it and still have the proper amount of time to scavenge the cylinder and refill it with fresh fuel mixture. Also, the distance the piston moves during the compression phase can be increased as well. This means that a larger volume of fuel mixture can be trapped at the beginning of every compression phase. If the actual CR were to be retained at a value identical to a standard engine, the volume of the combustion chamber must be increased as well, resulting in even greater trapped volume than would normally occur. Since the output of the engine is closely tied to the volume of fuel mixture inducted into the cylinder during each intake phase, the additional trapped volume will produce more heat and pressure within the cylinder during the power phase and will result in an increase in engine output.

Since the volume of the intake charge is now enhanced, the rate of pressure drop during the entire power phase will be slower. From TDC to the end of the power phase, the starting and ending cylinder pressures will be identical to those in a conventional engine with identical displacement, but the piston will have traveled a greater distance in the process. The actual cylinder pressure for every increment of piston movement will favor the cylinder with the larger initial volume of fuel mixture since the changes in piston position will have less influence on the total volume containing the pressure.

In the present invention, during the time that the piston will dwell at or near BDC, cylinder pressure will be at its lowest value, having allowed for the maximum expansion of the combustion gases to occur against the piston crown. During the exhaust phase, sufficient time is now available to allow the exhaust gases to leave the cylinder under their own pressure differential and without having to be pumped out by the piston. This will result in less work for the piston to do on the exhaust gases remaining in the cylinder at the end of the exhaust phase. The net result to the engine's power output will be increased since little or no energy from the power stroke will have to be invested in pumping pressurized exhaust gases out of the cylinder.

SUMMARY OF THE INVENTION

It is accordingly an object of the present invention to provide a mechanism and method for improving an internal combustion engine, a pump or compressor to increase the power output and enhance efficiency.

It is another object of the present invention to provide a mechanism and method for modifying the crankshaft of a reciprocating internal combustion engine, pump or compressor to generate an Epitrochoidal path for the lower end of the connecting rod to travel, resulting in the extended dwell of the piston at or near BDC. This path is generated by a member eccentrically mounted within the lower end of the connecting rod with the eccentric offset distance (or eccentricity) matched to the piston stroke and connecting rod lengths to maximize piston dwell and minimize connecting rod angles.

It is a further object of this invention to provide an improved mechanism in a machine with at least one cylindrical housing with a central axis having at least one reciprocating piston traveling in the cylindrical housing along the central axis between a top dead center position and a bottom dead center position, a crankshaft rotatably mounted in a crankcase in said machine for rotation about a crank axis with at least one crankpin radially disposed on said crankshaft and having a crankpin axis parallel to the crank axis, and a connecting rod with an upper end pivotally attached to said piston at an upper end journal and a lower end pivotally attached to said crankpin at a lower end journal, said upper end pivoting about an upper end journal axis parallel to said crank axis and said lower end pivoting about a lower end journal axis parallel to said crank axis; said improved mechanism comprising an eccentric bearing with an axially eccentric journal having an eccentric journal axis parallel to the lower end journal axis and offset from the crankpin axis, said eccentric bearing interposed between the lower end and crankpin to generate a noncircular path for the lower end during rotation of the crankshaft in the crankcase. It is also intended that said noncircular path be an epitrochoid and such epitrochoid path extends the time spent by the piston dwelling at or near bottom dead center position in the cylindrical housing during rotation of the crankshaft in the crankcase, and that this invention be equally applicable to machines operating on a four stroke or a two stroke cycle.

It is also an object of this invention that the distance between the upper end journal axis and the lower end journal axis is the radius of an arc which matches a lower portion of the epitrochoidal path during the time spent by the piston dwelling at or near bottom dead center position in the cylindrical housing during rotation of the crankshaft in the crankcase.

It is an object of this invention that one embodiment of the improved mechanism shall further comprise; at least one planetary gear set including at least one stationary sun gear fixedly attached to the crankcase with a sun gear axis in line with the crank axis, a revolving planet gear with a planet gear axis parallel to the sun gear axis and in mesh with the sun gear and of pitch diameter equal to the sun gear, the eccentric bearing mounted to the planet gear with the eccentric journal axis parallel to the planet gear axis and offset from the planet gear axis, and said eccentric bearing rotatably mounted in the lower end journal, and the crankpin rotatably mounted in the eccentric journal.

It is an object of this invention that an alternative embodiment of the improved mechanism shall further comprise; at least one internal toothed gear fixedly mounted to the crankcase with said internal toothed gear having an axis in line with the crank axis, at least one first spur gear with a first spur gear axis parallel to the axis of the internal toothed gear and in mesh with the internal toothed gear, at least one second spur gear with a second spur gear axis parallel to the axis of the first spur gear and in mesh with the first spur gear, the eccentric bearing mounted to the second spur gear with the eccentric journal axis parallel to the second spur gear axis and offset from the second spur gear axis, said eccentric bearing rotatably mounted in the lower end journal, and the crankpin rotatably mounted in the eccentric journal.

It is a further object of this invention to provide a method of enhancing the performance of a machine with at least one cylindrical housing with a central axis having at least one reciprocating piston traveling in the cylindrical housing along the central axis between a top dead center position and a bottom dead center position, a crankshaft rotatably mounted in a crankcase in said machine for rotation about a crank axis with at least one crankpin radially disposed on said crankshaft and having a crankpin axis parallel to the crank axis, and a connecting rod with an upper end pivotally attached to said piston at an upper end journal and a lower end pivotally attached to said crankpin at a lower end journal, said upper end pivoting about an upper end journal axis parallel to said crank axis and said lower end pivoting about a lower end journal axis parallel to said crank axis; comprising the steps of, providing an eccentric bearing with an axially eccentric journal and eccentric journal axis parallel to the lower end journal axis, placing said eccentric bearing in the lower end journal, placing the crankpin in the eccentric journal where the eccentric bearing journal axis is parallel to and offset from the crankpin axis, and causing the lower end to follow a noncircular path during rotation of the crankshaft in the crankcase. It is also intended that said noncircular path be an epitrochoid and such epitrochoid path extends the time spent by the piston dwelling at or near bottom dead center position in the cylindrical housing during rotation of the crankshaft in the crankcase, and that this method be equally applicable to machines operating on a four stroke or a two stroke cycle.

It is also an object of this inventive method to provide that the distance between the upper end journal axis and the lower end journal axis is the radius of an arc which matches a lower portion of the epitrochoidal path during the time spent by the piston dwelling at or near bottom dead center position in the cylindrical housing during rotation of the crankshaft in the crankcase.

It is also an object of this inventive method that one embodiment further comprises the steps of; providing at least one planetary gear set including at least one stationary sun gear fixedly attached to the crankcase with a sun gear axis in line with the crank axis, providing a revolving planet gear with a planet gear axis parallel to the sun gear axis and in mesh with the sun gear and of pitch diameter equal to the sun gear, mounting an eccentric bearing to the planet gear with the eccentric journal axis parallel to the planet gear axis and offset from the planet gear axis, and rotatably mounting said eccentric bearing in the lower end journal, and rotatably mounting the crankpin in the eccentric journal.

It is also an object of this inventive method that an alternative embodiment shall further comprise the steps of; providing at least one internal toothed gear fixedly mounted to the crankcase with said internal toothed gear having an axis in line with the crank axis, providing at least one first spur gear with a first spur gear axis parallel to the axis of the internal toothed gear and in mesh with the internal toothed gear, providing at least one second spur gear with a second spur gear axis parallel to the axis of the first spur gear and in mesh with the first spur gear, mounting the eccentric bearing to the second spur gear with the eccentric journal axis parallel to the second spur gear axis and offset from the second spur gear axis, rotatably mounting said eccentric bearing in the lower end journal, and rotatably mounting the crankpin in the eccentric journal.

It is another object of this inventive method that it be applicable to machines with at least one fixed exhaust port in the cylindrical housing further comprising the step of resizing and relocating the exhaust port along the axis of the cylindrical housing. Likewise, the inventive method shall be applicable to machines with at least one fixed intake port in the cylindrical housing further comprising the step of resizing and relocating the intake port along the axis of the cylindrical housing.

A crankshaft, expressed in simplest terms, is nothing more than a lever arm. The amount of rotational force transmitted by the lever arm is a function of the arm's effective length, the force acting upon it, and the direction from which the force is applied. Conventional piston driven internal combustion engines all utilize a crankshaft to convert their piston's reciprocating motion to a rotational motion. The problem with this arrangement is that the majority of the force acting on the lever arm is not applied when the actual effective moment arm is greatest in length during each power phase. As the crankshaft rotates, the effective moment arm lengthens but the force diminishes. The combination of force and effective moment arm length available during each power phase is multiplied by the frequency of the power pulses. The result is the measured output of the engine (neglecting friction.) The inventive Epitrochoidal crankshaft combines the majority of the available force with a modified moment arm in such a manner that the resulting output of an engine utilizing this crankshaft will be greater than an engine with a conventional style crankshaft of equal stroke. However, the enhanced power output is not due to an increased moment arm alone. The increase in available leverage makes it possible for the piston to travel further in the cylinder bore with pressure acting upon it, and that is where the power increase is realized. The increased length of the power phase and the better utilization of the trapped combustion gases combine to create more work on the piston during each power phase. The decrease in the moment arm at the bottom of the Epitrochoidal pattern, combined with the proper connecting rod length, cause the piston to sit virtually motionless for a significant amount of time, as measured in crankshaft angle of rotation. This time is utilized to empty the cylinder of exhaust gases and refill the cylinder with a fresh fuel charge without borrowing from the power phase. The outcome of the enhanced power phase with the piston dwell at or near BDC is a more powerful and efficient engine.

Engines with standard style crankshafts have their crankpins fixed at a specific distance from the center of the crankshaft. During the rotation of the crankshaft, the crankpin will travel in a circle. The diameter of that circle is the distance known as the stroke of the engine, and the piston travels the same distance in the cylinder bore, since it is joined to the crankpin through the connecting rod. In an engine equipped with an Epitrochoidal crankshaft, the crankpin also travels in a circle. However, the connecting rod is not directly attached to the crankpin. Instead, the lower end of the connecting rod is fitted over an eccentric bearing, which, in turn, is fitted over the crankpin and indexed in its location through gearing. The combination of the eccentricity of the bearing, the length of the connecting rod, the stroke of the crankshaft, and the indexing of the gearing all determine the path of the lower end of the connecting rod. However, the distance the piston travels in its bore is still the stroke of the engine, regardless of this different crankshaft arrangement. In the standard engine, the bottom of the connecting rod follows the circle generated by the crankpin, whereas in the inventive engine, the bottom of the connecting rod travels in an Epitrochoidal path. The eccentric bearing and its related gearing cause the path to exactly repeat with every rotation of the crankshaft, and the path can be oriented in any direction, based on the initial indexing of the gearing. The crankpin path in a standard engine is a fixed radius, since the crankpin is located a specific distance from the center of the crankshaft. The Epitrochoidal path continuously changes its radius due to the rotation of the eccentric bearing. Also, the Epitrochoidal path, when superimposed over the circular path produced by a standard crankshaft, is further from the center in some portions of the path and closer in others, all while sharing a common center of rotation. The length of the produced moment arm, measured from the center of the crankshaft to the point of applied force is constantly changing, as well. Therefore, both the changing radius and the increased moment arm contribute to the increased power output that the inventive design can produce. Increases in moment arm are directly responsible for increasing the piston's speed away from TDC so that it can reach the bottom of its stroke quicker, which contributes a longer distance of piston travel with pressure acting above it. The increases in the radius at the bottom of the produced pattern allow the piston to dwell at or near BDC since the arc swung by the on-centers length of the connecting rod is optimized to closely match the Epitrochoidal path. The variables of connecting rod length, desired stroke, and offset of the eccentric bearing must all be matched in order to produce the maximum piston dwell and minimize connecting rod angles.

By using the Epitrochoidal crankshaft, a torque curve generated during a single power phase will yield a higher peak torque value than a standard style crankshaft of similar stroke. This is accomplished through the longer moment arm that can be produced with the appropriate gearing and orientation of the eccentric bearing, combined with the pressure within the cylinder acting on the piston crown. Since work is dependent on piston travel and force, it must be understood that any crankshaft will produce the same total torque effort for a given piston area, travel while under pressure, and initial cylinder pressure. If, for example, the combustion chamber is a fixed volume and the initial pressure within it is always the same, work output will be the same, regardless of the type of crankshaft fitted in the engine provided the piston travels the same distance while pressure acts on it. If the crankshaft used has an extremely long stroke, the total piston movement will be greater, due to the longer moment arm. However, the distance the piston moves after the exhaust phase begins will occur without the aid of cylinder pressure. That means, to obtain more work during the power phase, a given piston must travel a greater distance while pressure acts upon it or the initial combustion chamber pressure must be greater. The product of the two variables, force and distance, must be greater.

Any point on the circular path of a standard crankshaft's crankpin can be equated to degrees of crankshaft rotation, which in turn can be used to determine piston position. Likewise, any point on the path produced by the Epitrochoidal crankshaft equipped engine can be equated to crankshaft orientation and piston position. However, when identical crankshaft angles of rotation are compared between the two styles of crankshafts, the piston position is not the same, except at TDC and BDC. The rate at which the two pistons move within their respective cylinder bores is different when comparing the two crankshaft designs.

While turning at the same RPM, an engine equipped with the Epitrochoidal crankshaft will cause the piston to move away from the top of the bore quicker than a piston installed in an engine with a standard style crankshaft of similar stroke. This is due to the increased moment arm generated by the eccentric bearing and followed by the path of the lower end of the connecting rod. The longer moment arm causes the piston to accelerate away from TDC faster. However, when the piston in this engine approaches the bottom of its stroke, the rate of movement is slower than the piston in an engine equipped with a standard style of crankshaft. This is due to the shorter moment arm, which affects the path of the connecting rod's lower end. Again, it is the combination of desired stroke length, offset within the eccentric bearing, and connecting rod length that determines the actual moment arm length at any given point in the rotation of the inventive engine design. The important difference between an Epitrochoidal crankshaft equipped engine and a standard crankshaft equipped engine is that when total piston travel is held constant, the moment arm of the Epitrochoidal crankshaft equipped engine is greater in some points of crankshaft rotation and lesser in others. Piston movement within the bore of a standard crankshaft equipped engine is determined by the crankshaft stroke. That stroke is also a measure of the diameter of the circle that the crankpin follows. The diameter, which is a constant, determines the maximum moment arm that the piston and connecting rod can act on. Since the Epitrochoidal crankshaft equipped engine causes the lower end of the connecting rod to travel in a non-circular path, the moment arm can be made greater during the phase of the power stroke when pressure on the piston crown can act on the crankshaft more advantageously. Since the displacement of the cylinder is held constant, the non-circular path pulls the lower end of the connecting rod closer to the center of the crankshaft and, since the path has a radius matched to the on-centers length of the connecting rod, the piston will dwell at or near BDC. The pressure within the cylinder is made to act on a longer moment arm and to push the piston a greater distance. Both of these attributes contribute to a greater engine output while the dwell at the bottom of the cylinder bore allows sufficient time for the exhaust phase to occur.

Displacement is the term used to express the size of an internal combustion engine. It is derived from the product of a single cylinder's cross-sectional area, the distance the piston travels from TDC to BDC, and the number of cylinders in the engine. It depicts the volume of air the engine can ingest, based on the volume change created by the movement of the piston(s). In the calculation for displacement, no mention is made concerning several engine factors such as the volume of the combustion chamber, the CR, or whether the engine operates on a two- or four-stroke cycle. Also, the method of induction (normally aspirated or forced induction) or the distance a piston travels while pressure acts on its upper surface does not influence the displacement calculation. The volume of the trapped fuel mixture is determined by measuring the volume within the cylinder when the last escape route out of the cylinder is closed. This occurs somewhere in the rotation of the crankshaft normally depicted as the compression phase, when the piston has already begun its upward travel in the cylinder bore. In the standard engine, the last escape path is closed at a point well beyond BDC. The actual volume and mass of the fuel charge is then somewhat less than the volume of the cylinder head plus the cylinder displacement. The piston, having traveled up the cylinder bore and made the total volume within the cylinder less than its maximum value, will tend to regurgitate a portion of the fuel charge back out of the cylinder until it is trapped, especially at lower engine speeds. Standard engines suffer from the fact that the momentum of their fuel charges is immediately met with a pressure rise in the cylinder they are trying to enter since the piston, upon reaching the bottom of the cylinder bore, immediately reverses its direction and begins to rise in the cylinder. The incoming fuel mixture is now stalled due to the increasing pressure and decreasing volume within the cylinder before the intake valve closes. The net result is that the rising piston displaces a portion of the fuel charge during every intake phase, and the trapped fuel mixture volume is always less than the total cylinder displacement. Only at elevated engine speeds does the cylinder manage to trap the greatest volume of fuel mixture when the momentum of the fuel charge is able to overcome the movement of the mixture displaced out of the cylinder. In the Epitrochoidal crankshaft equipped engine, the piston will dwell at the bottom of the cylinder bore, and the maximum volume will be available for the fuel charge to enter. The last escape route out of the cylinder can then be closed off while the volume is great, and a much larger volume of fuel mixture will be trapped within the cylinder. During the compression stroke, the increased volume will be compressed into the volume available at the cylinder head. If the Epitrochoidal crankshaft equipped engine is to maintain the original trapped CR at a value matching that of the standard engine, the volume at the cylinder head will have to have been increased. Otherwise, the actual CR will be too high, and detonation and overheating will be likely. Increasing the cylinder head volume adds even greater volume to the total volume of fuel mixture trapped within the cylinder at the beginning of the compression stroke. Since the displacement of an engine is dependant on the total distance the piston travels during its stroke within the cylinder bore, the Epitrochoidal crankshaft equipped engine can be designed to have a piston stroke identical to the stroke of a standard crankshaft equipped engine, which will not affect the displacement of the engine. However, the Epitrochoidal crankshaft equipped engine will ingest more fuel mixture for every power stroke and, since power output is directly related to the volume of fuel mixture trapped within the cylinder, the engine will produce more power for a given displacement.

The advantages to be derived from the present invention can be classified as increasing power for a given displacement or increasing efficiency for fuel economy reasons. Power and efficiency increases can be realized in either two- or four-stroke cycle engines. There is a finite amount of energy in a finite amount of fuel, and the described invention extracts more useable pressure from the burning of its fuel charge before expelling the exhaust gases. All engines must expel exhaust gases from their cylinders in order to have enough time to refill their cylinders for the next power stoke. This occurs as the piston is still moving down the cylinder, and effectively ends the amount of work done on the piston. In a two-stroke engine equipped solely with ports in its cylinder, the port heights and widths are fixed since the ports are simply holes in the cylinder wall, although some highly developed racing engines have an exhaust port that can change height depending on the RPM of the engine. The term Time-Area (hereafter abbreviated as "TA") represents a value that expresses the amount of time that an area is exposed for the flow of gases through it. Valves or cylinder ports cannot be made to open instantaneously, which would allow them to pass the largest volume of gases for a given amount of time. Rather, they open and close incrementally. Two stroke cycle engines utilizing ports have their area maximized at either TDC or BDC only, since some degree of masking by the piston occurs at all other points of piston position. Four stroke cycle engines (and some two stroke cycle engines) that are equipped with poppet valves must allow the valves to come off of their seats, rise to some maximum height, and then return to their seats. The TA value determines the RPM range in which the port or conduit is most efficient. Regardless of engine speed, the exposed area of the port or conduit will always be the same. However, as the RPM of the engine rises, the time between each of the operating cycles gets shorter, affecting the ability of the port to flow the proper volume of gases necessary for efficient engine operation. Due to the variance in the time component, ports or conduits cannot have a fixed TA value. The value must be determined at a particular engine speed.

As engine speed is increased, the time between each phase of operation, whether two or four stroke cycle, is decreased. At some engine speed, determined by the porting or valve timing established by the engine manufacturer, peak torque output is achieved, which is the point where the highest Volumetric Efficiency occurs. Volumetric Efficiency is a measure of the ability of the engine to draw in the maximum amount of fuel mixture into each cylinder. When an engine is running, each phase of the engine's operation requires some measure of time in order for a volume of gases to pass through either a port or a valve. As engine speeds increase, the time to accomplish these phases gets shorter while the volume of gas increases and the area of the port or valve remains constant. At some RPM, the amount of time available for the passage of those gases becomes insufficient to get the phase fully completed since the ports or valves become a choke point to the gas flow.

In a two stroke cycle prototype of an Epitrochoidal crankshaft equipped engine (hereafter, the "inventive prototype" or "inventive prototype engine"), the piston speed up and down the cylinder bore varies from the speed of a piston in a standard engine operating at the same RPM. In the original standard engine, the sizes of the ports within the cylinder were chosen by the manufacturer to provide a smooth idle, easy starting, and some RPM potential. In the inventive prototype, the port sizes are physically different than the standard engine's ports, but the port TA values are identical to the standard engine's values. Time-area values were duplicated in the prototype's cylinder according to the calculated value of TA rather than just copying the physical dimensions of the standard ports. By utilizing a spreadsheet, the geometry of the standard engine was duplicated mathematically by using the stock values of connecting rod length, piston stroke, and port heights. Since the ports are symmetrical with respect to the cylinder axis, they are open or closed an equal amount of time on either side of TDC or BDC. The spreadsheet enabled the area of the port window exposed by the piston to be calculated for every degree of crankshaft rotation. Summing the portions of the port area exposed between their opening and closing points provided the total area exposed during the interval of crankshaft rotation involving port exposure. In the standard engine, the exhaust port is fully open at only one position in the crankshaft rotation, which is BDC. Likewise, the intake port is fully open only at TDC. The standard engine upon which the inventive prototype engine is based is known as a 'piston port' engine. Intake and exhaust duration is controlled solely by the piston position in the cylinder bore, rather than by pressure differential, as would happen within a reed valve equipped engine during the intake phase (One other type of induction device is a disk with an hole in it, rotating in front of a port, which allows for unsymmetrical intake port timing and is known as a disk valve.)

Using a similar approach and a parallel spreadsheet to enable direct comparison, the piston position in the inventive prototype, relative to any angle of crankshaft rotation, was determined (Comparisons between the standard engine and the inventive prototype engine assume that the two crankshafts are rotating at the same RPM.) If the ports in the cylinder of the inventive prototype engine were left dimensionally the same as in the standard engine, the exhaust port would be uncovered much earlier than the standard engine's port. Since the piston in the inventive prototype engine dwells at the bottom of the cylinder bore for 43 degrees of crankshaft rotation, the exhaust port has no masking by the piston and remains fully open during this entire portion of crankshaft rotation. In comparison, the standard engine's exhaust port is fully open for only 9 degrees of crankshaft rotation. Since the piston dwells at the fully open position, the product of time and area combine to produce a TA value in excess of the original calculated value for the standard engine's ports. In the prototype, the width of the port is unchanged and only the height is adjusted. The original manufacturer of the engine chose the port widths with the considerations of piston ring support and wear, and these were maintained in the prototype. Since the TA value was too great, the height of the ports was lowered, which would cause two things to happen at once: The time portion of the TA value would fall since the port would be opened at a lower piston position and for a fewer number of degrees of crankshaft rotation, and the area portion of the TA value would fall as well, since the port was physically lower. Using the calculated values for piston position, it was possible to determine the combination of port height and number of crankshaft degrees that would duplicate the same TA values that were designed in the standard engine.

By lowering the port heights in a standard engine, more of the pressure and heat provided by the combustion of the fuel can be utilized to drive the piston downward, which increases the amount of work done on the piston every power phase. The trade-off is that the effective operating RPM range is lowered since the available TA values of the ports to scavenge the cylinder of exhaust gases and replace them with fresh fuel mixture is now shortened. A low RPM means that the number of power phases an engine can apply to the piston in a given time period is reduced, so the power output is diminished. On the other hand, port heights that are comparatively high mean more time is available to scavenge the cylinder, but the height of the port limits the trapped volume and mass of the fuel mixture entering the cylinder, which in turn limits the amount of work that can be done on the piston. Each power pulse is relatively weak, but the port can now support a greater amount of flow, which means that the engine can achieve a higher RPM. More power pulses are delivered to the crankshaft, and while individually weaker, their sheer numbers provide a higher output of horsepower.

The addition of the Epitrochoidal crankshaft as described in the present invention does not increase power by itself. What it allows is additional time to scavenge the cylinder if the port heights are left unchanged, which will increase the TA values of the ports at engine speeds identical to unmodified standard engines. This is accomplished by allowing the piston to travel to the lower portion of its travel at a rate faster than in a standard engine of equal stroke and operating at the same RPM. This alone will enable the Epitrochoidal crankshaft equipped engine to reach a higher RPM since the engine can still sufficiently scavenge the engine's cylinder at an elevated RPM. If the desired RPM range is to remain in the same realm as the unmodified standard engine, the Epitrochoidal crankshaft will cause the unmodified ports to have excessively large TA values. The simplest modification is to lower the ports, which will decrease the TA values of the ports and bring those values back into the original operating RPM range of the standard engine. However, lowering the ports now allows the piston to travel further with pressure acting upon it, which enhances the amount of work done on the piston during every power pulse. There will now be sufficient time to scavenge the engine's cylinder at the RPM range originally set by the stock engine, and power output will be enhanced due to the increased work done on the piston. Since the ports are fixed in their height and are now lower in the cylinder bore, the rising piston will cover the port windows and trap a larger volume of fuel mixture than the standard engine was capable of. As discussed earlier in this disclosure, the original actual CR in the standard engine was based upon the ratio of the total trapped volume of the fuel mixture compared to the fully compressed volume of the same. If the actual CR in the engine equipped with the Epitrochoidal crankshaft is to be preserved at the standard engine's value, additional volume must be added to the combustion chamber of the Epitrochoidal crankshaft equipped engine. Otherwise, the greater volume of the trapped fuel mixture would be compressed into the original combustion chamber volume, raising the actual CR to a value exceeding that of the standard engine. Adding combustion chamber volume reduces the actual CR to a value identical to the standard engine but will further add to the trapped volume. Again, an engine's power output is equated to the volume of the trapped fuel mixture during the power phase, so more power will be produced at engine speeds identical to the standard engine's RPM.

In an engine equipped with the Epitrochoidal crankshaft, the rapidly descending piston would create a large amount of momentum in the incoming fuel mixture, which would aid cylinder filling and fuel atomization. Upon entering the cylinder, the fuel mixture would not face the immediate pressure rise from a moving piston. Instead, the piston would remain at or near the bottom of the cylinder bore while the intake valve was closing. The result would be that a greater volume of fuel mixture would be trapped within the cylinder, resulting in more work being done on the piston for every power phase. Rather than having the cylinder fill to capacity only during an elevated engine speed, the motionless piston would allow a greater range of engine speeds where the cylinder would fill with the greatest efficiency. The fuel mixture quality would be enhanced due to the greater air-stream velocity through the fuel metering system, and better fuel atomization would result. The trapped mixture would tend to burn with greater efficiency within the combustion chamber, and the result would be a decrease in emissions of unburned fuel in the exhaust gases ultimately escaping into the atmosphere.

Two stroke cycle engines utilizing both ports and poppet valves can be made more fuel-efficient since the piston movement and position does not control the timing of the valves' opening and closing points. Instead, a camshaft actuates the valves. However, with the addition of an Epitrochoidal crankshaft, the piston is again made to dwell at the bottom of its stroke due to its quick descent within the cylinder bore. Again, the original port heights could be lowered without reducing the ports' TA values required for operation in the intended speed range, and the valve timing would be modified to complement the ports' TA values. The combination of lowering of the ports and delaying valve action means that more work can be done on the piston at the same RPM as the original engine. More of the heat and pressure created by the burning of the fuel would be utilized for pushing on the piston crown for each power phase while maintaining sufficient time to scavenge the cylinder.

Four stroke cycle engines utilizing the Epitrochoidal crankshaft can be made to be both more fuel efficient and more powerful. In this type of engine, there are no ports cut in the cylinder walls. Both intake and exhaust functions are controlled by poppet valves located in either the cylinder head (in valve-in-head engines) or the engine block (as in a flat-head or L-head design.) These valves rely instead on camshaft lobes to open and close them, and the valve motion is independent of the piston position and movement. If a similar Epitrochoidal path is followed by the lower end of the connecting rod as in the two stroke cycle versions previously discussed, the piston will fall within the cylinder bore faster than in a stock engine and will dwell near the bottom of the bore for some time. The engine equipped with the Epitrochoidal crankshaft can be made to ingest the same amount of fuel mixture as in a standard engine (or more, depending on camshaft selection, combustion chamber volume, and intended engine application), which would generate the same initial cylinder pressure, but the distance of piston movement with pressure above it (the power phase) would be increased. If so, this would increase the efficiency of the engine since more work would be done on the piston due to the non-symmetrical timing of the valve opening and closing events. The unique geometry caused by the Epitrochoidal crankshaft would cause the piston to be pushed down the bore at a faster rate and for a greater distance than would otherwise have been possible. Since the piston traveled further with the same initial starting pressure, more work will have been done on the piston, and the remaining pressure within the cylinder would be less at the time of the opening of the exhaust valve. A lower pressure escaping the cylinder would mean that the produced sound would be much less, so the exhaust note of the inventive engine would not be as great. While not a performance gain, the lower noise level would contribute less to noise pollution. Since sound is a form of energy, and that energy ultimately comes from the burning of the fuel, the lower exhaust tone would indicate a more efficient engine. The pressure in the standard cylinder would be greater at the end of the power phase since the piston would not have moved as far, and the opening exhaust valve allows useable cylinder pressure to escape without contributing to the power output.

In the four stroke cycle example of an engine equipped with the Epitrochoidal crankshaft, exhaust pressure that would normally be lost due to the standard engine's valve motion time constraints of evacuating the cylinder would be put to work forcing the piston further down the cylinder bore. Seldom mentioned in engine operation is the force required to open an exhaust valve against cylinder pressure. Cam lobes must initially overcome the spring pressure that is holding the valve on its seat before the valve moves. It is said that the work required compressing the spring is 'given back' to the system as the spring decompresses during valve closure. However, the surface area of the valve, combined with the pressure within the cylinder, must also be overcome before the valve will lift off of its seat. This additional force can be found when the area of the valve head is calculated and then multiplied by the cylinder pressure. As an example, an exhaust valve of only 1.00-inch diameter has a surface area of 0.785 square inches. If the pressure in the cylinder at the time of valve opening is 100 psi, the force required to open the valve is 78.5 pounds above that required to overcome the spring pressure. Since the exhaust gases leave the cylinder under their own pressure, no energy is returned to the system to recoup the force necessary to overcome the force against the valve head. This necessary force is subtracted from the net power output of the engine, and usable cylinder pressure is lost out of the exhaust tract. By holding the cylinder pressure within the cylinder and allowing it to further expand, as would be possible with the inventive engine, the loss in net power would be lower and the cylinder pressure would be more fully utilized. Once the pressure had dropped on its own during the dwell period, the piston would rise in the cylinder to sweep only residual gases out, rather than having to act on pressurized exhaust gases. There would be less negative work done on the piston, so the net gain would again be greater.

Since an engine equipped with the Epitrochoidal crankshaft allows a greater volume of fuel mixture to be ingested for each power phase, the engine's output will be greater. The enhanced cylinder filling occurs at all engine speeds, so horsepower and torque curves obtained from dynamometer testing will indicate an improvement throughout the entire RPM range. As an example, the two-stroke cycle inventive prototype engine traps approximately 15 percent more fuel mixture on every compression phase. This increased volume is due to the lowering of the exhaust port and the added volume in the cylinder head to maintain the original trapped CR of the standard engine. Since the exhaust port opens first and closes last in this engine, both the force and distance of the piston travel are enhanced and therefore produce more work on the piston. Comparing the horsepower and torque curves of the engine equipped with the Epitrochoidal crankshaft to the curves generated by a standard engine will reveal that the inventive engine's curves are similar in shape to the standard engine's curves, but elevated at all points by 15 percent. At the peak point on the standard engine's horsepower curve, the Epitrochoidal crankshaft equipped engine will produce 15 percent more power. Horsepower curves are typically 'bell' shaped, with the peak horsepower value occurring at the top of the bell. If the greatest amount of horsepower that the standard engine could produce were all that were desired, the inventive engine, having a similar but elevated power curve, would be required to rotate at a lower RPM in order to achieve that power output. At lower engine speeds, fuel consumption is reduced while the original power levels are maintained.

DETAILED DESCRIPTION OF THE INVENTION

Figure 1:
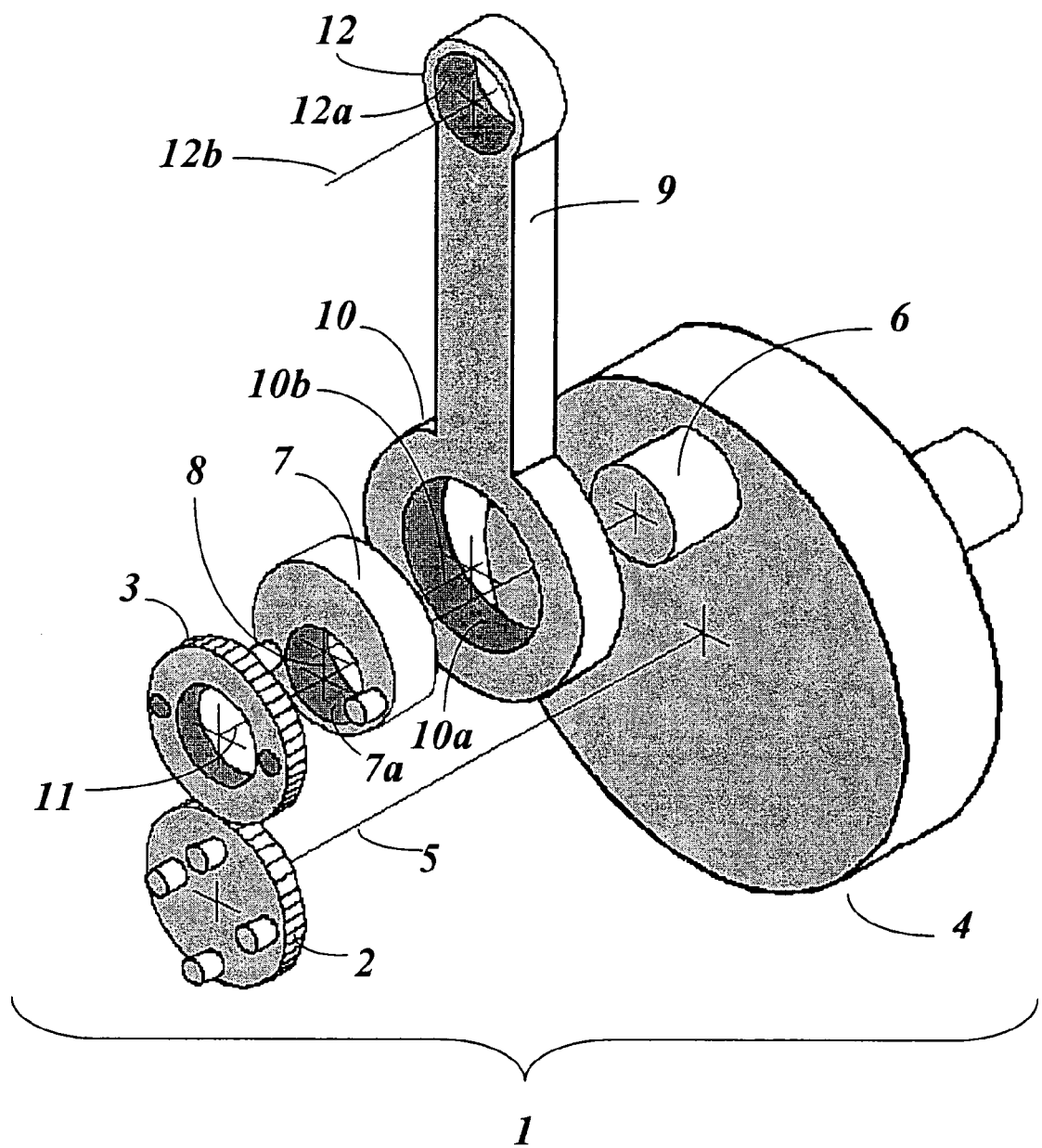
FIG. 1 is an exploded view of an Epitrochoidal crankshaft in a single crank wheel, overhung configuration.

One embodiment of the inventive Epitrochoidal crankshaft assembly, as depicted in the exploded view shown in FIG. 1, is a simplified planetary gear system 1 utilizing a stationary sun gear 2 and a revolving planet gear 3 of equal pitch diameter. The two gears are kept in constant mesh by a crankshaft 4 that may also serve as a flywheel. The sun gear 2 is fixedly attached to the engine's crankcase, which is not shown, with its axis 5 on the same rotational axis as that of the crankshaft 4. The planet gear 3 is centered on the crankpin 6 by either a bushing or a bearing. These two gears each have a pitch diameter equal to the distance between the axis 5 of the crankshaft 4 and the axis of the crankpin 6, or one-half the stroke of the crankshaft 4. Since the gears are constantly in mesh, the distance between the centers of both gears will never vary; therefore, if the path of the axis 11 of planet gear 3 was plotted as it revolved around the stationary sun gear 2, the resultant path would be circular and overlay the path of the axis of the crankpin 6. An eccentric bearing 7 with an eccentric journal 7a is mounted to the planet gear 3 and the center of the eccentric journal 7a is axially offset from both the axis 11 of the planet gear 3 and the axis of the crankpin by a specific distance 8. The lower end 10 of the connecting rod 9 having a lower end journal 10a is fitted over the eccentric bearing 7. Both the eccentric bearing 7 and the lower end 10 and lower end journal 10a of connecting rod 9 having a lower end journal axis 10b share a common center, which is offset from the crankpin 6 by the specific distance 8. During the rotation of the crankshaft 4, the stationary sun gear 2 will cause the planet gear 3 to rotate on its axis 11, which is the same axis as that of the crankpin 6. The eccentric bearing 7, being attached solidly to the planet gear 3, will be made to rotate on the axis of the crankpin 6. Since the crankpin 6 itself is rotating with the crankshaft 4, the planet gear 3 and eccentric bearing 7 will both be rotating around the crankpin 6 while it travels with the crankshaft 4. Due to the combination of the crankshaft 4 and the stationary sun gear 2, the planet gear 3 and the eccentric bearing 7 will rotate twice for every single rotation of the crankshaft 4. The center of the eccentric bearing 7 will not follow the circular path of the crankpin 6, but will trace an Epitrochoidal path. The axis 10b of the lower end journal 10a of the lower end 10 of the connecting rod 9 follows the center of the eccentric bearing 7 along this path as well. The Epitrochoidal shape will closely approximate a circle when the center of the eccentric bearing 7 is offset from the axis 11 of the planet gear 3 by a small amount and will assume a pronounced kidney shape as the center of the eccentric bearing 7 is offset away from the axis 11 of the planet gear 3. The Epitrochoidal path generated by the stroke length and offset distance 8 produces a pattern that will reproduce itself with every rotation of the crankshaft 4. The orientation of the pattern is achieved by aligning the offset distance 8 of the eccentric bearing 7 with a straight line drawn between the axis 5 of the crankshaft 4 and the axis of the crankpin 6. The offset amount 8 will be pointed directly away from the crankshaft axis 5 so that the center of the eccentric bearing 7 is the maximum distance from the axis 5 of the crankshaft 4. This position correlates to the TDC of the piston when the crankshaft 4 is at zero degrees of rotation. Such an arrangement will cause the Epitrochoidal pattern to have both a long moment arm in the upper portion of the pattern and a shorter moment arm along the bottom of the pattern. The lower portion of the pattern will have a large radius. The upper end 12 of the connecting rod 9 having an upper end journal 12a with an upper end journal axis 12b is pivotally connected to a piston which is not shown. The center-to-center length of the connecting rod 9 which is the distance between the upper end journal axis 12b and the lower end journal axis 10b must be chosen to match this large radius so that as the crankshaft 4 rotates, the lower end 10 of the connecting rod 9 will follow the Epitrochoidal path while the upper end 12 of the connecting rod 9 remains constrained along the cylinder centerline. The piston, being attached at the upper end 12 of the connecting rod 9, will dwell at the bottom of its stroke for a considerable amount of crankshaft rotation. Since the inventive crankshaft involves the epitrochoid pattern, it is called an Epitrochoidal crankshaft.

Figure 2:
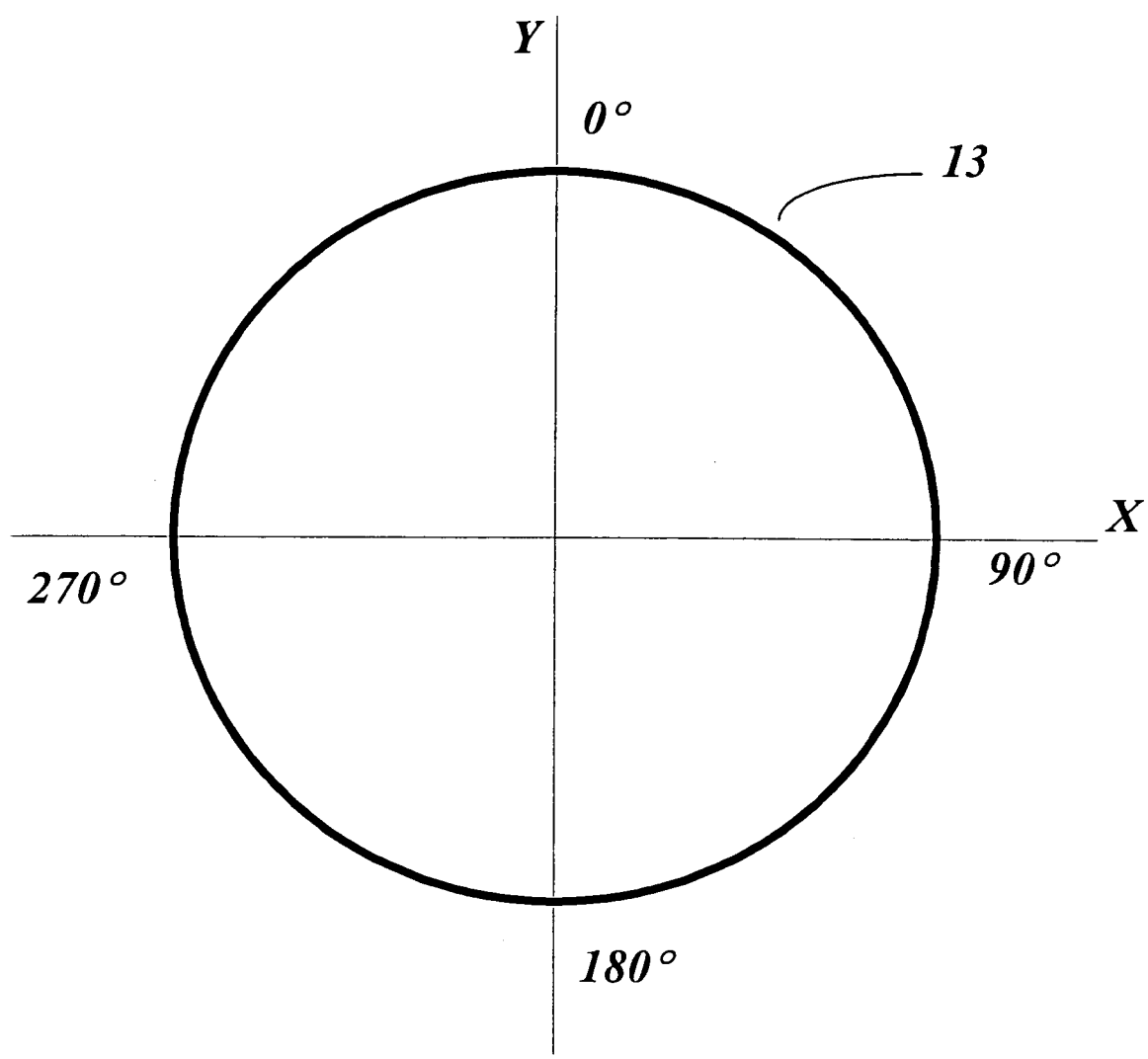
FIG. 2 graphically depicts the circular path traveled by the center of the crankpin in a conventional engine.

In the development of the present invention, two engines were mathematically modeled. One was a commercially available conventional style engine and one was an engine equipped with the inventive Epitrochoidal crankshaft. Both engines have the same bore and stroke dimensions and therefore have the same displacement. The results indicate that the engine equipped with the Epitrochoidal crankshaft produces more power than the conventional engine at similar crankshaft speeds. Since horsepower is a function of the work performed on the piston and how often it occurs (the engine's RPM), the Epitrochoidal crankshaft equipped engine produces more horsepower due to the increased work done on the piston during the power phases at the same engine speed. This resulted in the modeled engine equipped with the inventive Epitrochoidal crankshaft producing 15 percent more total power, and 41 percent greater peak torque during each power phase than obtained from the standard engine. An inventive prototype engine containing the Epitrochoidal crankshaft has been built and run, based on a stock Homelite® two stroke cycle piston-port string grass trimmer engine with the following dimensions (inches, cubic inches, centimeters, and cubic centimeters are abbreviated "in," "ci," "cm," and "cc" respectively):

Bore: 1.3125 in or 3.334 cm
Stroke: 1.125 in or 2.858 cm
Displacement: 1.52 cubic inches or 24.95 cc
Exhaust port opens at 102 degrees past TDC: 0.749 in or 1.902 cm from TDC
Transfer ports open at 128 degrees past TDC: 0.954 in or 2.423 cm from TDC
Intake port closes at 60 degrees past TDC: 0.563 in or 1.430 cm from TDC
Spark ignition occurs at 28 degrees before TDC: 0.082 in or 0.208 cm from TDC
Combustion chamber volume of 0.1745 cubic inches or 2.86 cc's
CR (measured full stroke): 9.72:1
CR (measured at exhaust port closing): 6.8:1
Connecting Rod length of 2.200 in or 5.588 cm FIG. 2 is a graph that depicts the circular path 13 traveled by the center of the crankpin in a standard conventional engine during a complete 360-degree revolution. It also depicts the same circular path that the center of the crankpin travels in an engine equipped with an Epitrochoidal crankshaft. In the conventional engine from which the inventive prototype was modeled, the diameter of this circle is equal to the stroke length of 1.125 inches. The difference is that in a conventional engine, the circular path of the center of the crankpin is also the path of the center of the lower end of the connecting rod. In an engine equipped with an Epitrochoidal crankshaft, the circular path of the center of the crankpin is not the same as the path of the center of the lower end of the connecting rod. The center of the lower end of the connecting rod is located away from the center of the crankpin a distance equal to the offset distance provided by the eccentric bearing. FIG. 2 was plotted using the X and Y coordinates of the center of the crankpin for both a conventional and inventive engine where:

X=Stroke Length×Sine (Crankshaft Angle) and
Y=Stroke Length×Cosine (Crankshaft Angle)

In FIG. 2, the crankpin path is nothing more than a circle produced with the above formulae.

In all graphs depicting crankpin position, the X-axis is considered to be the horizontal axis and the Y-axis is considered to be the vertical axis. The cylinder centerline is assumed to be along the Y-axis, above the modeled crankshafts. Furthermore, rotation of all crankshafts modeled is assumed to be clockwise with TDC along the Y-axis at zero degrees of crankshaft rotation. BDC is located 180 degrees away from TDC along the Y-axis also. The origin of the X and Y coordinate system is considered to be the center of rotation of the modeled crankshafts.

Figure 3:
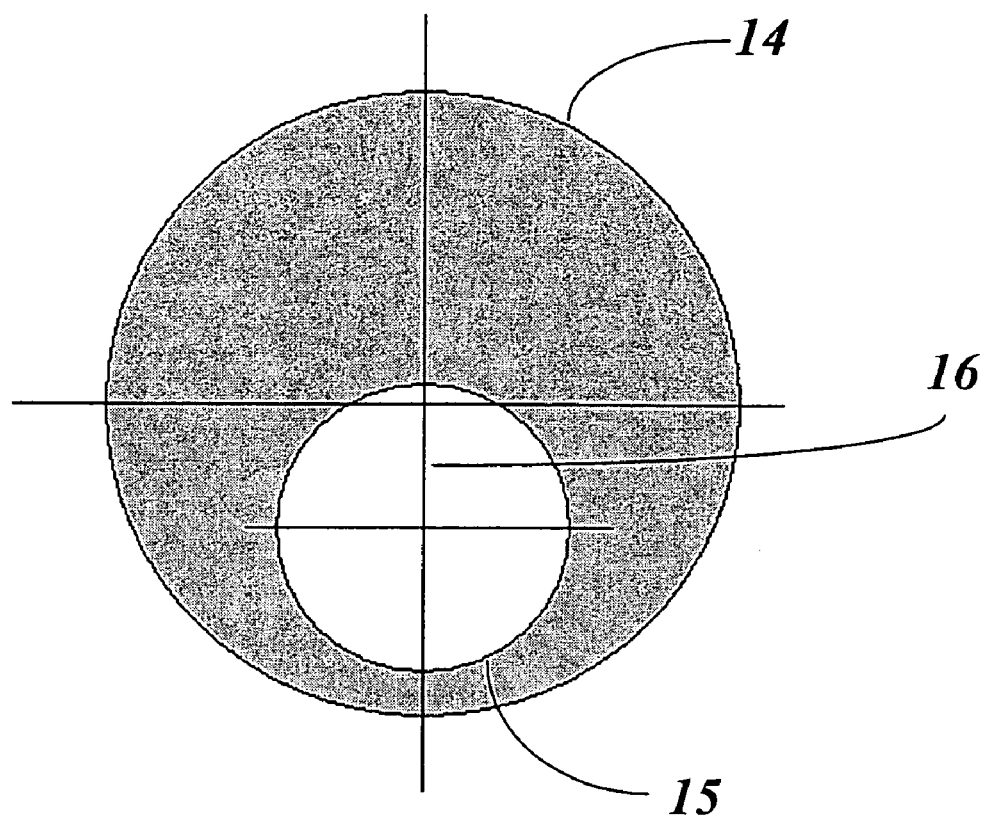
FIG. 3 is a representation of the geometry of an eccentric bearing fitted within the lower end of a connecting rod.
Figure 4:
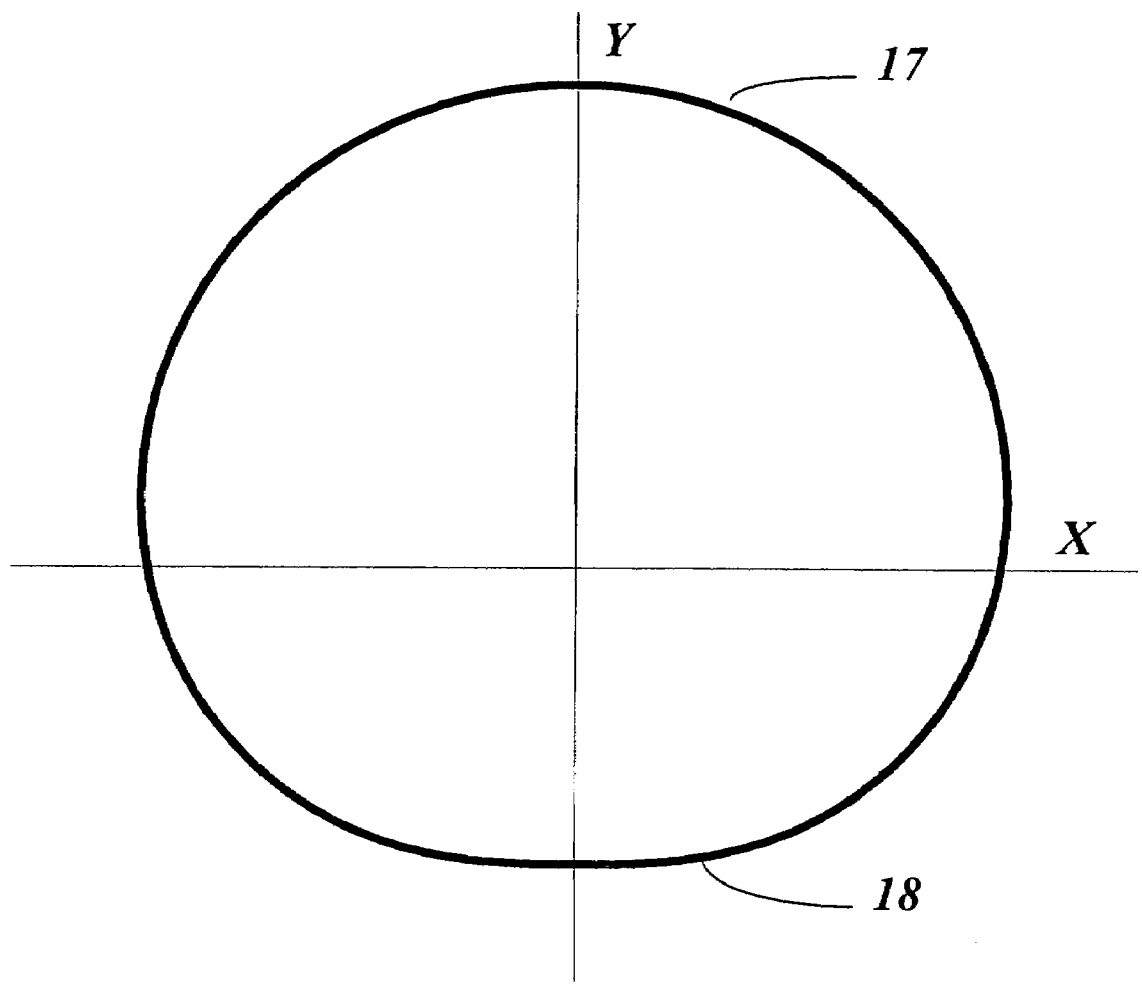
FIG. 4 graphically depicts the path traveled by the center of the eccentric bearing in an engine with an Epitrochoidal crankshaft.

FIG. 3 depicts the geometry of the eccentric bearing. The definition of the eccentric bearing is the bearing that fits within the lower end of the connecting rod. Its outer diameter 14 is equal to the inner diameter of the lower end journal of the connecting rod, minus a small clearance for the bearing and/or the lubricating oil wedge. The inside diameter 15 of the hole in the inner portion of the eccentric bearing is equal to the outside diameter of the crankpin, plus a small running clearance for the bearing and/or the lubricating oil wedge. The center of the outside diameter of the bearing is offset from the center of the inside hole of the eccentric bearing by a predetermined amount 16. This is the offset that is referred to in the formula for the Epitrochoid pattern and was represented in FIG. 1 as the specific distance 8. FIG. 4 represents the path 17 of the center of the lower end of the connecting rod in an engine equipped with an Epitrochoidal crankshaft. The center of the crankpin is a fixed distance from the center of the crankshaft and traces a circular path. In the case of the prototype engine, the crankpin circle has a radius of 0.5625 inches and therefore a diameter of 1.125 inches. Therefore, this is the measured stroke of the engine, or the vertical distance the piston travels in the cylinder. The inventive prototype engine used the stock crankshaft in its construction. The graph shown in FIG. 4 is produced as a result of the offset 16 of the eccentric bearing shown in FIG. 3. The offset 16 is a calculated amount that results from the length of the connecting rod and the length of stroke desired in the prototype inventive engine. This calculated offset produces the large radius portion 18 of the pattern (near the bottom where the path runs within the stock stroke circle) and the extended area (at the top where the path runs outside the stock stroke circle.) By calculating an exact offset distance 16, the piston is made to dwell at bottom dead center (BDC), or within 0.001 inches of BDC for a total of 43 degrees of crankshaft rotation in the modeled engine equipped with the inventive Epitrochoidal crankshaft.

Figure 5:
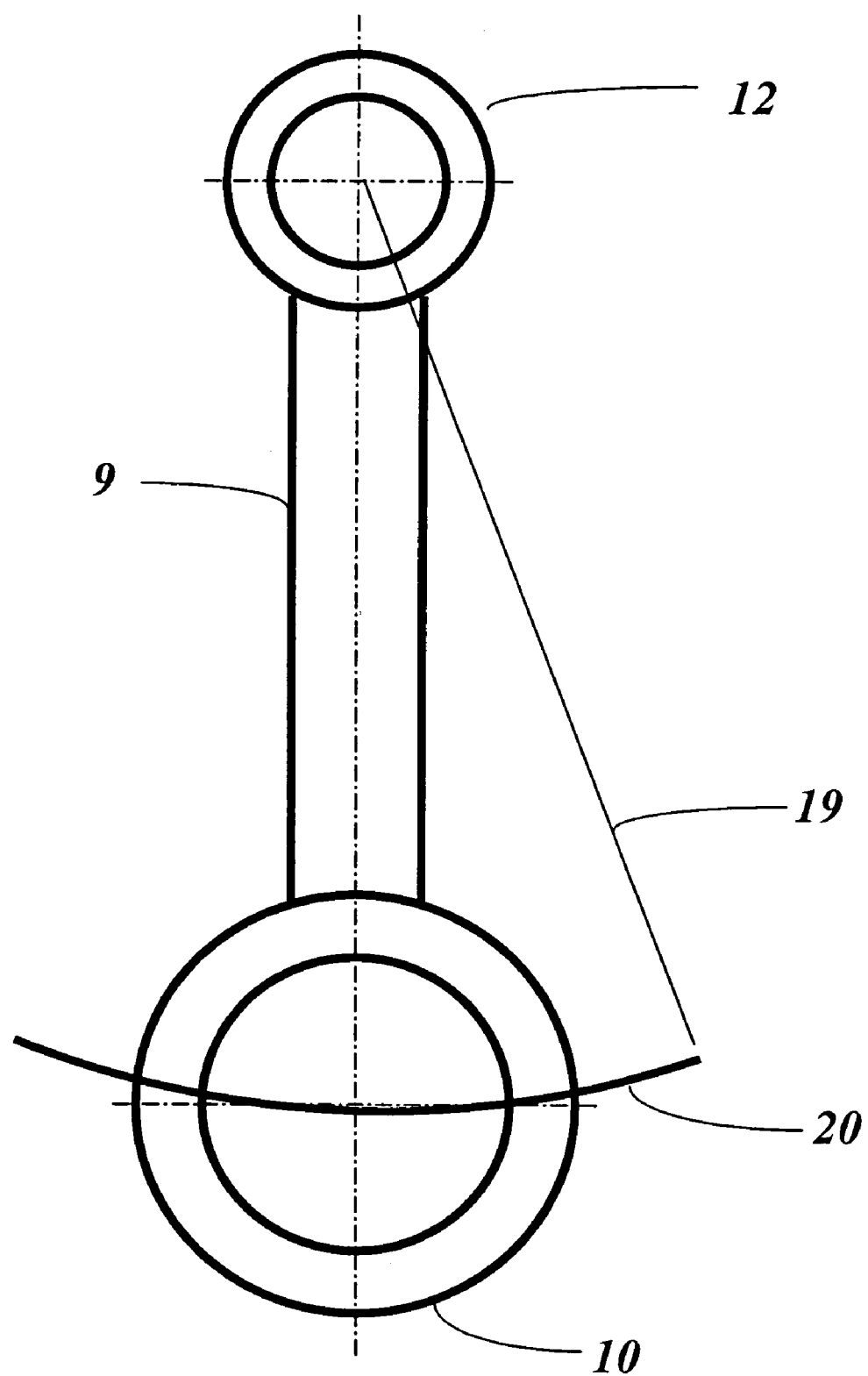
FIG. 5 is a representation of the curve defined by the on-centers length of a connecting rod.

Referring to FIG. 5, the on-centers length 19 of the connecting rod 9 traces an arc 20 which closely matches and is approximately equivalent to the large radius portion 18 of the pattern shown in FIG. 4. The wrist pin that attaches the connecting rod 9 and piston at the upper end 12 of the connecting rod 9 is also a pivotal bearing that allows the connecting rod 9 to deflect to either side of the cylinder centerline. If the piston is held stationary and the connecting rod 9 is allowed to swing back and forth, the center of the lower end 10 of the connecting rod 9 will swing in an arc 20 of radius equal to the on-centers length 19 of the connecting rod 9. This is depicted in FIG. 5.

This arc 20 is duplicated in the lower portion 18 of the pattern produced by the eccentric bearing and its offset distance 16. The graph in FIG. 4 was plotted using the X and Y coordinates of the center of the eccentric bearing. This is also the path that the lower end 10 of the connecting rod 9 will follow. This is not the path of the crankpin, which is circular. The X and Y coordinates are expressed as follows:

$X = [\frac{1}{2} \text{Stroke} \times \text{Sine (Crank Angle)}] - [\text{Offset} \times \text{Sine}$
$(2 \times \text{Crankshaft Angle})]$ $Y = [\frac{1}{2} \text{Stroke} \times \text{Cosine (Crank Angle)}] - [\text{Offset} \times \text{Cosine } (2 \times \text{Crankshaft Angle})]$ Where (in this example): Stroke=1.125 inches, Offset=0.1334 inches Crank Angle=Degrees of Crankshaft Rotation This is a simplified version of the formulae for an epitrochoid, for which the inventive design is named.

The epitrochoid formulae for the X and Y coordinates are:

$$X = (a+b)\text{Sine}\theta - (c)\text{Sine}\frac{(a+b)}{b}\theta \text{ and}$$

$$Y = (a+b)\text{Cosine}\theta - (c)\text{Cosine}\frac{(a+b)}{b}\theta$$

Where: $a$ and $b$ = radius of circle $c$ = offset distance $\theta$ = angle of rotation The inventive prototype engine is based on a conventional engine with a stroke of 1.125 inches and a bore of 1.3125 inches. The on-centers length of the stock connecting rod is 2.200 inches. This connecting rod length causes it to swing to a maximum deflection from the cylinder centerline, which will side load the piston against the cylinder bore. To properly compare the inventive prototype engine and conventional style engines, the prototype engine was built to have the same stroke and bore dimensions as the original engine. The stock piston and cylinder were used so that the bore would remain the same, and, when combined with the stock stroke length, would cause the inventive prototype engine to have the same displacement. In order for the inventive prototype engine to have the same deflection of the connecting rod, the inventive prototype engine required a connecting rod that was 3.000 inches, measured center to center.

Figure 6:
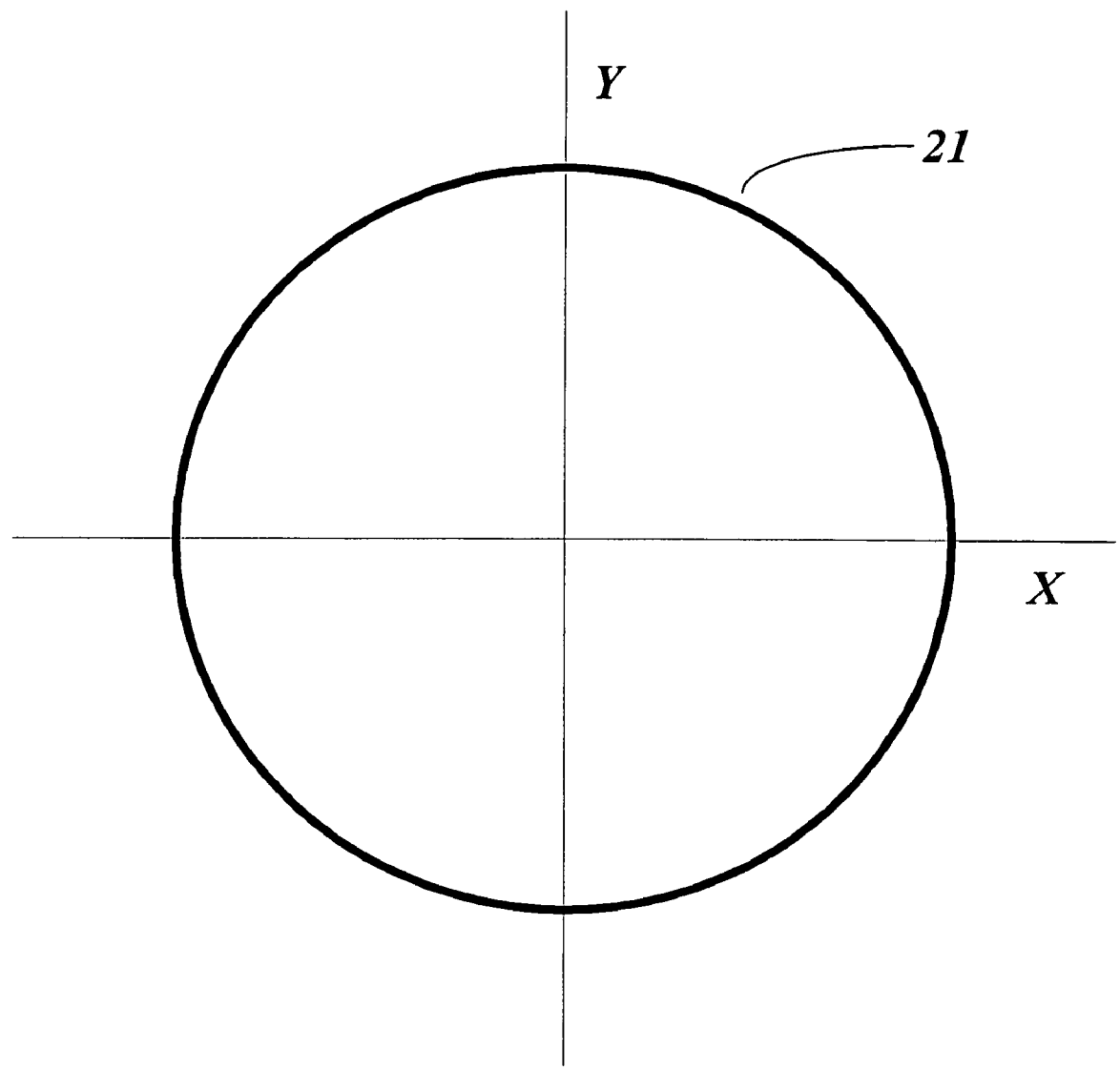
FIG. 6 graphically depicts the path traveled by the center of the eccentric bearing having zero offset in a prototype engine with an Epitrochoidal crankshaft.
Figure 7:
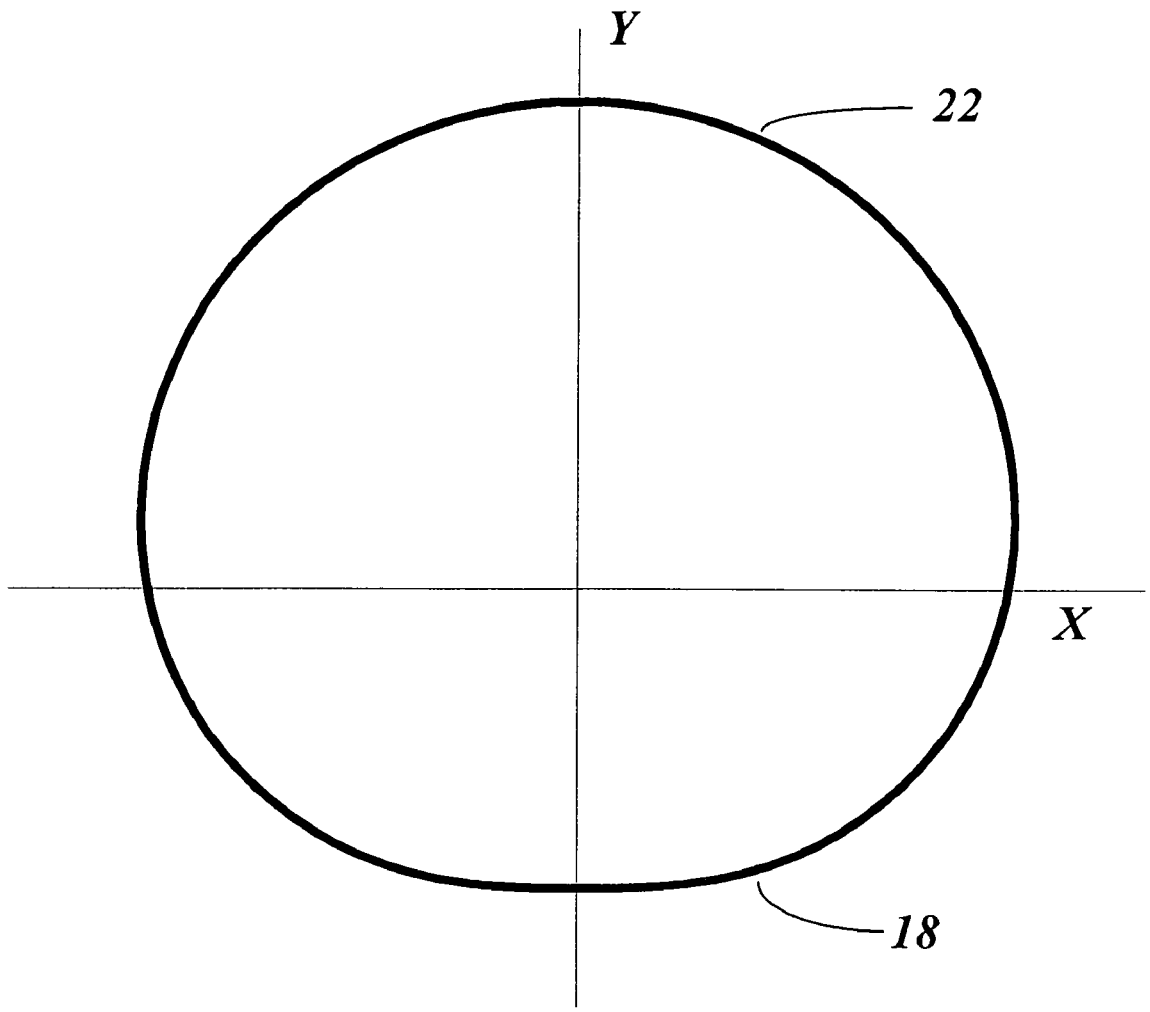
FIG. 7 graphically depicts the path traveled by the center of the eccentric bearing in a prototype engine with an Epitrochoidal crankshaft and 0.1334 inches of offset.
Figure 8:
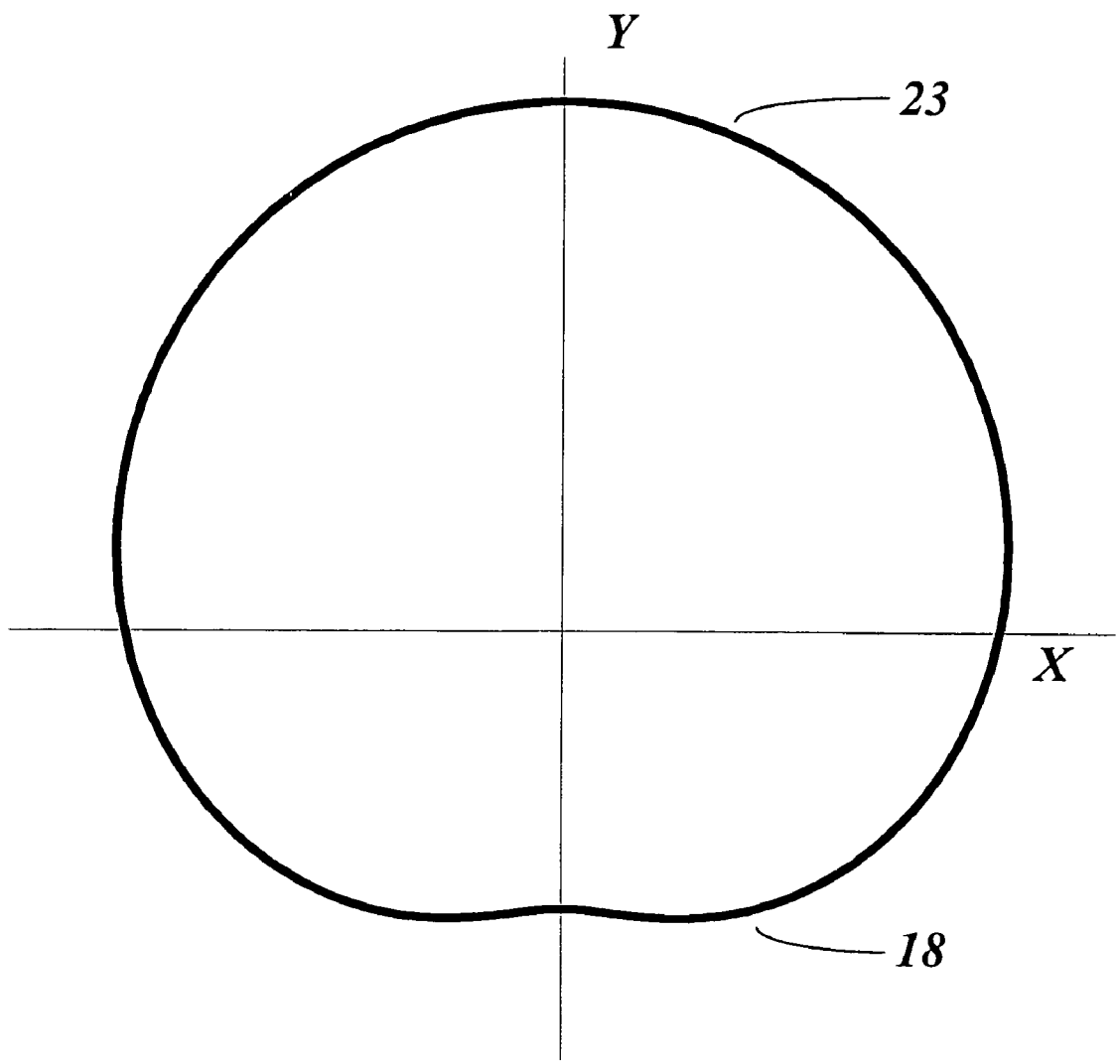
FIG. 8 graphically depicts the path traveled by the center of the eccentric bearing in a prototype engine with an Epitrochoidal crankshaft and excessive offset.

The procedure used to determine connecting rod length and eccentric bearing offset may be illustrated by referring to FIG. 1 and assuming that the offset distance 8 of the eccentric bearing 7 from the axis of the crankpin 6 is zero inches. As the planet gear 3 revolves around the sun gear 2 during crankshaft rotation, the center of the eccentric bearing 7 will trace a circular path exactly on top of the path generated by the crankpin 6. Since there is no offset of the eccentric bearing 7, the lower end 10 of the connecting rod 9 will trace the same circular pattern and the piston position and motion will be unchanged from stock values. The vertical distance of the circular path along the cylinder centerline will be equal to the stroke of the crankshaft 4. Assuming the planet gear 3 is on top of the sun gear 2 and that their centers are in line with the cylinder centerline and also that the centerline of the eccentric bearing 7 is also on the cylinder centerline, if the offset 8 of the eccentric bearing 7 is moved upward, away from the axis 5 of the crankshaft 4 by 0.001 inches, the resulting path of the center of the eccentric bearing 7 will no longer be circular. At TDC, the path will be 0.001 inches above the circular path of the crankpin 6 and 0.001 inches further away from the axis 5 of the crankshaft 4. At BDC, the path will be 0.001 inches within the circular crankpin path and 0.001 inches closer to the axis 5 of the crankshaft 4. The vertical distance of the newly generated path along the cylinder centerline will still be equal to the stroke of the crankshaft 4 and the piston will still travel 1.125 inches, as in the case of the prototype engine. As the offset 8 of the eccentric bearing 7 is moved further upward, the resulting path of the center of the eccentric bearing 7 will continue to increase in radius along the lower half of the pattern as the radius of curvature of the pattern increases in that area. Piston travel will continue to be unchanged at 1.125 inches. The goal is to continue to move the offset distance 8 upward until an eccentric bearing offset distance is found that produces a bottom portion of the pattern that matches and closely approximates an arc traced by a radius equal to the on-centers length 19 of the connecting rod 9 as depicted in FIG. 5. FIGS. 6, 7, and 8 demonstrate various offset distances 8 when applied to a crankshaft 4 with a desired 1.125-inch stroke. Since the amount of connecting rod deflection was chosen to equal the stock engine measurement, the optimum connecting rod length becomes 3.000 inches.

FIG. 6 illustrates the path 21 where the offset 8 is equal to zero. The resulting path is a circle equal to that of the path 13 of the crankpin 6 as shown in FIG. 2 for a conventional engine.

FIG. 7 illustrates the path 22 where the offset 8 is the correct amount of 0.1334 inches. The lower portion 18 of the resulting path is an arc described by a radius that matches the radius of the curve 20 equal to the on-centers length 19 of the connecting rod 9 as shown in FIG. 5. The piston will tend to dwell within 0.001 inches of the BDC position for 43 degrees of crankshaft rotation.

FIG. 8 illustrates the path 23 where there is an excessive amount of offset 8.

The final test of the offset and connecting rod distances is to observe the piston stroke not just at TDC and BDC but also during a complete crankshaft revolution. If the offset distance 8 is too great, the lower portion 18 of the path will have a radius greater than the radius produced by the connecting rod length 19. This will cause the piston to reach its maximum lower travel before and after BDC, as measured at the crankshaft. The total distance that the piston would travel would now be greater than the allowed 1.125 inches even though the vertical distance along the cylinder centerline would remain 1.125 inches. If measured by the piston travel, BDC for the piston will occur at the two points of maximum piston travel, and the stroke of the piston will exceed 1.125 inches. These points will occur before and after BDC as measured by the crankshaft since the piston will have reached its point of lowest travel, traveled upward to crankshaft BDC, traveled back down to the second point of lowest travel, and then traveled back to the top of the cylinder bore to TDC. If the total distance of the piston travel were taken into account, the engine would have a displacement greater than was intended.

Figure 9:
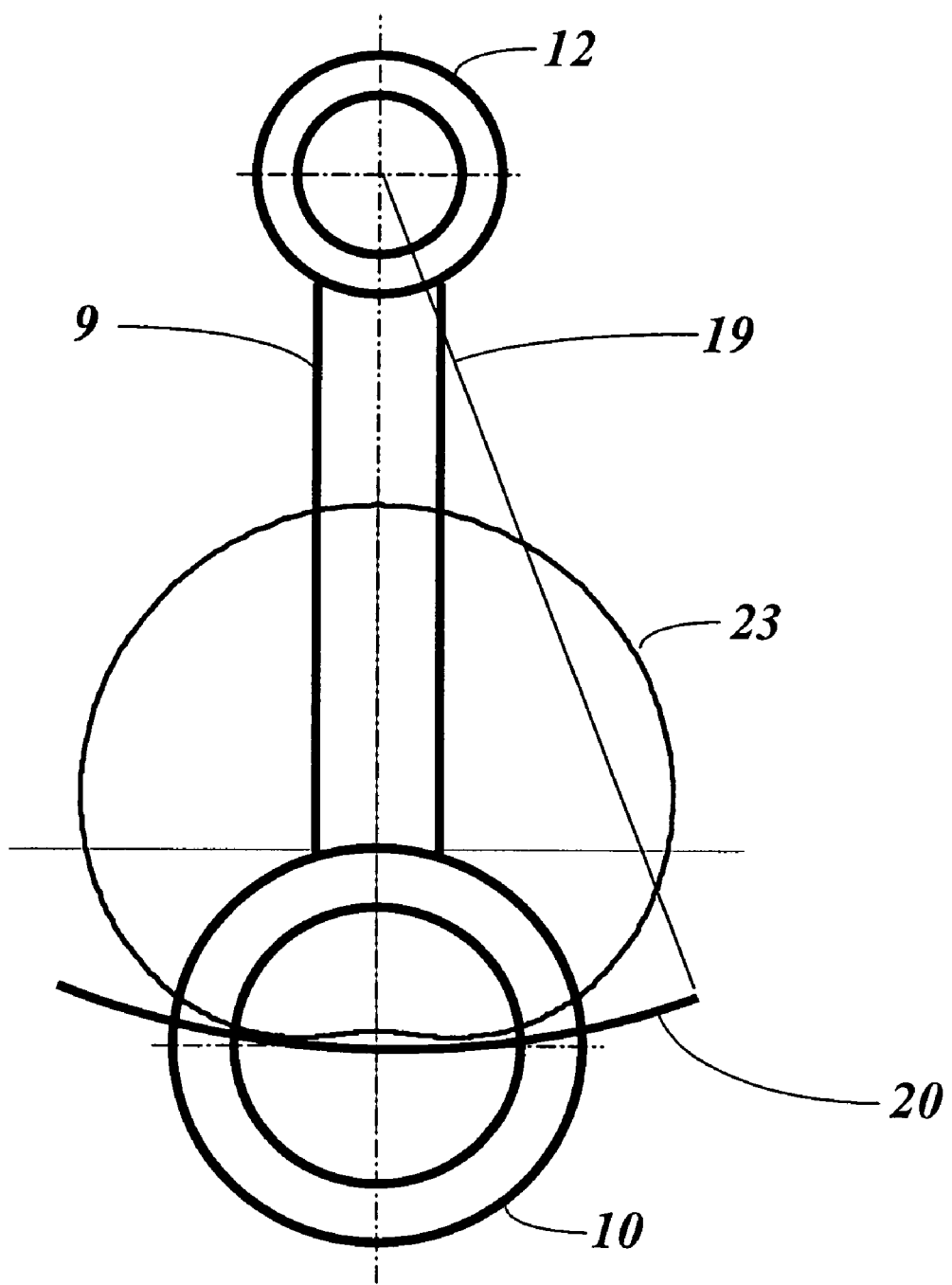
FIG. 9 is a representation of the differences in the curves defined by the on-centers length of a connecting rod on a prototype engine and the path traveled by the center of the eccentric bearing with excessive offset distance.
Figure 10:
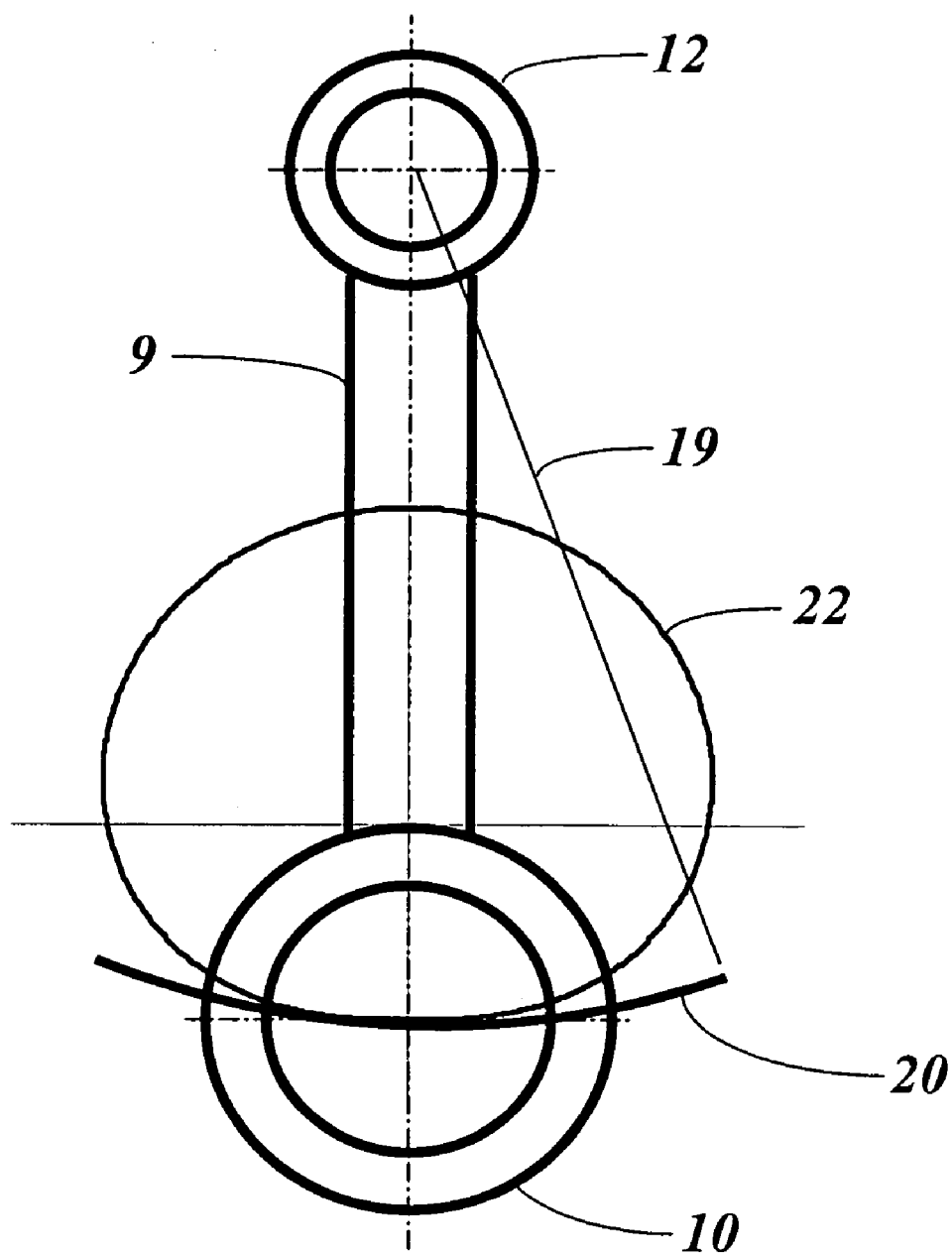
FIG. 10 is a representation of the curve defined by the on-centers length of a connecting rod on a prototype engine and the path traveled by the center of the eccentric bearing with correct offset distance.

FIG. 9 depicts the path 23 produced by an eccentric bearing 7 with too great an offset distance 8, superimposed on the depiction from FIG. 5, showing the on-centers length 19 between the top end 12 and the bottom end 10 of the connecting rod 9 and the arc 20 generated with the on-centers length 19 as the radius. FIG. 10 depicts the path produced with a correct offset distance 8, likewise superimposed on the depiction from FIG. 5. When the offset distance 8 is correctly matched with the connecting rod length 19, BDC is no longer a single point of maximum piston travel as it is in the stock engine but instead becomes a range of points, during which the piston remains virtually motionless. Piston dwell at or near BDC is increased, which is the desired effect.

Again, this orientation of the pattern was modeled in the prototype inventive engine. The values produced by this method for the prototype invention yields an offset distance of 0.1334 inches and a connecting rod length of 3.000 inches with a 1.125-inch stroke, as measured at both the crankshaft and the piston movement. In order to produce the optimum pattern for the connecting rod to follow for the prototype engine, the following dimensions were used (inches, cubic inches, centimeters, and cubic centimeters are abbreviated "in," "ci," "cm," and "cc" respectively):

Bore: 1.3125 in or 3.334 cm
Stroke: 1.125 in or 2.858 cm
Displacement: 1.52 cubic inches or 24.95 cc
Gear size (for both stationary and moving gear): 0.5625 in or 1.4288 cm pitch diameter
Eccentric bearing offset: 0.1334 in or 0.3388 cm
Connecting Rod length: 3.000 in or 7.620 cm
Exhaust port opens at 87 degrees past TDC: 0.855 in or 2.172 cm from TDC
Transfer ports open at 109 degrees past TDC: 1.018 in or 2.586 cm from TDC
Intake port closes at 50 degrees past TDC: 0.4107 in or 1.043 cm from TDC
Spark ignition occurs at 20.5 degrees before TDC: 0.082 in or 0.208 cm from TDC
Combustion chamber volume of 0.1992 cubic inches or 3.264 cc's
CR (measured full stroke): 8.6:1
CR (measured at exhaust port closing): 6.8:1

With reference to the path 17 depicted in FIG. 4, the ignition point may be selected based on piston position, and without regard for actual crankshaft rotation. Piston position in the stock engine for spark timing is set to occur at 28 degrees BTDC, where the piston is located 0.082 inches away from the TDC position. The piston position at that point in crankshaft rotation is equal to the inventive prototype's piston position at 20.5 degrees BTDC.

Since the inventive design places the piston farther away from the crankshaft centerline at TDC than the standard engine, the moment arm is greater by the amount of eccentric bearing offset, which is 0.1334 inches. This longer moment arm results in increased piston speed, which lowers the piston toward the bottom of the cylinder bore faster. Torque curves modeled for the prototype engine show that the increased moment arm does produce a greater torque on the crankshaft while returning a lesser torque toward the end of the power stroke.

When comparing the motion of the piston in the epitrochoidal crankshaft equipped engine to that of the motion of a piston in a standard crankshaft equipped engine, the piston in the epitrochoidal crankshaft equipped engine has cylinder pressure above it for fewer degrees of crankshaft rotation. It would seem that the epitrochoidal crankshaft equipped engine couldn't produce a similar amount of power as the standard style engine. However, the actual distance of the piston movement per degree of crankshaft rotation in the epitrochoidal crankshaft equipped engine is greater than in a standard engine during the power phase. Comparing piston movement in the epitrochoidal crankshaft equipped engine to that of a piston from a standard crankshaft equipped engine, with both having the same stroke and same rate of crankshaft rotational speed (RPM), the piston from the epitrochoidal crankshaft equipped engine will travel further in the same amount of time than the piston from the standard crankshaft equipped engine. This is due to the increased moment arm length. Likewise, during the portion of crankshaft rotation when the moment arm is shorter, the piston will not travel as far. During the power phase, the rapid piston movement allows the piston to reach the bottom of the cylinder bore quicker than a conventional engine's piston. At or near the bottom of its travel, the crankshaft of the epitrochoidal crankshaft equipped engine is still turning at the same rate of rotational speed as the conventional engine, but the piston in the epitrochoidal crankshaft equipped engine is stopped. In the case of the inventive prototype engine, the piston is within 0.001 inches of its BDC position from 159 degrees of crankshaft rotation, past BDC, and until 201 degrees of crankshaft rotation. Since the piston travel is symmetric on either side of BDC, the total number of degrees of crankshaft rotation that the piston sits at or near BDC is 43. Conversely, the standard engine's piston is within 0.001 inches of BDC for a total of 9 degrees of crankshaft rotation.

An alternative proposed inventive prototype engine is based on the four stroke cycle Briggs & Stratton® 5 Horsepower horizontal shaft engine, common to tillers and lawn tractors. This engine was chosen for conversion to an epitrochoidal crankshaft equipped engine due to its simplicity of construction and availability. However, the inventive design is such that it can be adapted to all four stroke cycles engines, and this prototype engine serves as further proof of the Epitrochoidal crankshaft concept.

If timing of the phases of engine operation is to be controlled independently of piston motion, a camshaft is typically employed to operate intake and exhaust valves. The camshaft in a four-stroke cycle engine is geared to the rotation of the crankshaft, typically being driven at one half of the crankshaft speed. The cam lobes are designed to force the intake and exhaust valves open and can be fashioned to produce any desired valve motion, although it is the valves themselves that control the flow of gases through the intake or exhaust conduits. In the example that follows, the standard engine camshaft has been unaltered in both its lobe shape and in its timing of the valve events and is applied to both the standard and inventive prototype engine designs. Therefore, the timing and duration of the valve events is no different in either engine. In effect, the TA values that the camshaft produces in the intake and exhaust conduits are unaltered, since the duration of the valves being off their seats is the same in both the standard and inventive prototype engine. The standard engine's camshaft may not be the optimal cam design for the inventive prototype engine. However, the stock camshaft produces considerable power in the engine equipped with the Epitrochoidal crankshaft. The dimensions of the stock engine are as follows (inches, cubic inches, centimeters, and cubic centimeters are abbreviated "in," "ci," "cm," and "cc" respectively):

Bore: 2.562 in or 6.507 cm
Stroke: 2.438 in or 6.193 cm
Displacement: 12.57 ci or 206 cc
Exhaust valve opens at 130 degrees after TDC
Intake valve closes at 75 degrees before TDC
Spark ignition occurs at 28 degrees before TDC (piston position at 0.1852 in from TDC)
Combustion chamber volume: 2.285 ci or 37.4 cc
CR (measured full stroke): 6.5:1
Actual CR (measured by trapped intake volume): 3.45:1
Connecting Rod length of 3.875 in or 9.843 cm As discussed earlier in the description of the inventive prototype two-stroke cycle engine, the CR that the manufacturer of the standard engine chose (6.5:1) is based on two factors—the actual displacement of the cylinder and the actual displacement of the combustion chamber. There is no mention of the actual volume of fuel mixture trapped within the cylinder during the compression phase. That volume is determined by the position of the piston at the time of the intake valve closing. Based on the valve timing listed above, the volume trapped in the cylinder is determined by the position of the piston at the time of the intake valve closing, which is 75 degrees of crankshaft rotation BTDC. The piston position is 1.0867 inches down in the cylinder at that time. In order to maintain the same CR in the inventive prototype engine, the trapped cylinder volume in the inventive prototype engine is figured in a similar manner, except that the cylinder head volume must be calculated so that the actual CR matches the same value as the original engine's CR. Since the stock camshaft and valve motion it produces are being employed, the piston in the inventive prototype engine is 1.634 inches down in the cylinder bore at the time of the intake valve closure. Therefore, to maintain the CR in the inventive prototype engine, the cylinder head volume in the inventive prototype engine must be increased. The actual trapped volume increases by the amount of additional cylinder bore gained, which means the prototype engine now ingests more fuel mixture during every intake phase. The inventive prototype engine traps more fuel mixture during every intake phase while still maintaining the same actual CR. Therefore, at all points within the original engine's intended RPM range, the inventive prototype engine will be ingesting more fuel mixture. As was described earlier in the discussion of the inventive prototype two-stroke cycle engine, the additional fuel mixture will result in raising the original torque and horsepower curves vertically, while still maintaining the original shape.

Since the CR in the stock engine was determined by the total stroke of the piston and the combustion chamber volume, the inventive prototype engine actually has a lower CR than the stock engine, if figured in the same manner. While it would seem that the inventive prototype engine would run poorly at such a low CR, it must be remembered that figuring the CR on full stroke displacement, rather than actual trapped volumes, can be misleading. If the cylinder head were left untouched in the inventive prototype engine, the CR would mathematically be identical to the stock engine's value since they would both be calculated based on total stroke. However, the actual CR would climb dramatically since a larger volume of fuel mixture would be forced into the original combustion-chamber volume. This new CR-would certainly increase the output of the inventive prototype engine (provided detonation did not occur) since the initial cylinder pressure would be greater and the resulting pressure curve would be increased, but that would introduce an undesirable advantage into the comparison. By maintaining the same initial cylinder pressure, a more reasonable comparison can be made that highlights the advantages produced by the addition of the Epitrochoidal Crankshaft.

Applying the same logic as was applied in the development of the two-stroke cycle inventive prototype; the four-stroke cycle inventive prototype would have the following dimensions (inches, cubic inches, centimeters, and cubic centimeters are abbreviated "in," "ci," "cm," and "cc" respectively):

Bore: 2.562 in or 6.507 cm
Stroke: 2.438 in or 6.193 cm
Displacement: 12.57 ci or 206 cc
Eccentric bearing offset: 0.2781 in or 0.7064 cm
Exhaust valve opens at 130 degrees after TDC
Intake valve closes at 75 degrees before TDC
Spark ignition occurs at 20.2 degrees before TDC (piston position at 0.1852 in or 0.4704 cm down in bore)
Combustion chamber volume: 3.43 ci or 56.21 cc's
CR (measured full stroke): 4.66:1
Connecting Rod length of 4.2096 in or 10.69 cm
Actual CR (measured by trapped intake volume): 3.45:1

Applying these dimensions to the produced pattern, and taking into account the increased intake volume, the inventive prototype engine now has a total torque output that is 35.8% greater than the original stock engine output.

During the power stroke in both the stock and inventive prototype engines, the location of the piston at the point of the opening of the exhaust valve makes an interesting comparison. In the stock engine, the piston is located 2.117 inches down in the bore, while the inventive prototype engine has its piston located at 2.381 inches down in the bore. The total stroke distance of both engine examples is 2.438 inches. In the stock engine, the piston travel with cylinder pressure acting on it amounts to 86.8% of the total stroke before the exhaust valve opens. In the inventive prototype engine, the piston travels 97.6% of the total stroke distance with pressure acting upon its top before the exhaust valve opens.

The first embodiment of the invention as generally depicted in FIG. 1 calls for two gears to be used. The use of this arrangement forces the crankshaft to assume a single crank wheel configuration, which is used for some small engines. In this configuration with an overhung load, support bearings are located on the same side of the crankshaft. However, this type of crankshaft is not conducive to multiple piston arrangements utilizing a single crankshaft. The moving gear in the inventive prototype must be free to rotate on the crankpin and mesh with the stationary gear as well. This prohibits having dual crank wheels on both sides of the crankpin, which would allow driving off of either end of the crankshaft or having multiple crankpins on the same crankshaft. The piston and the combustion pressures acting through it via the connecting rod dictate that the crankpin must be of sufficient diameter and strength to withstand those forces. At the same time, the moving gear must retain sufficient strength to transmit the rotational forces acting upon it, but as it is bored to accept the crankpin, the amount of material remaining between the crankpin and the root of the gear teeth is reduced, especially when a rolling element type of bearing is employed. One could not build an engine with a large diameter crankpin since the gear teeth strength would be compromised when the gear was bored to fit the crankpin.

Figure 13:
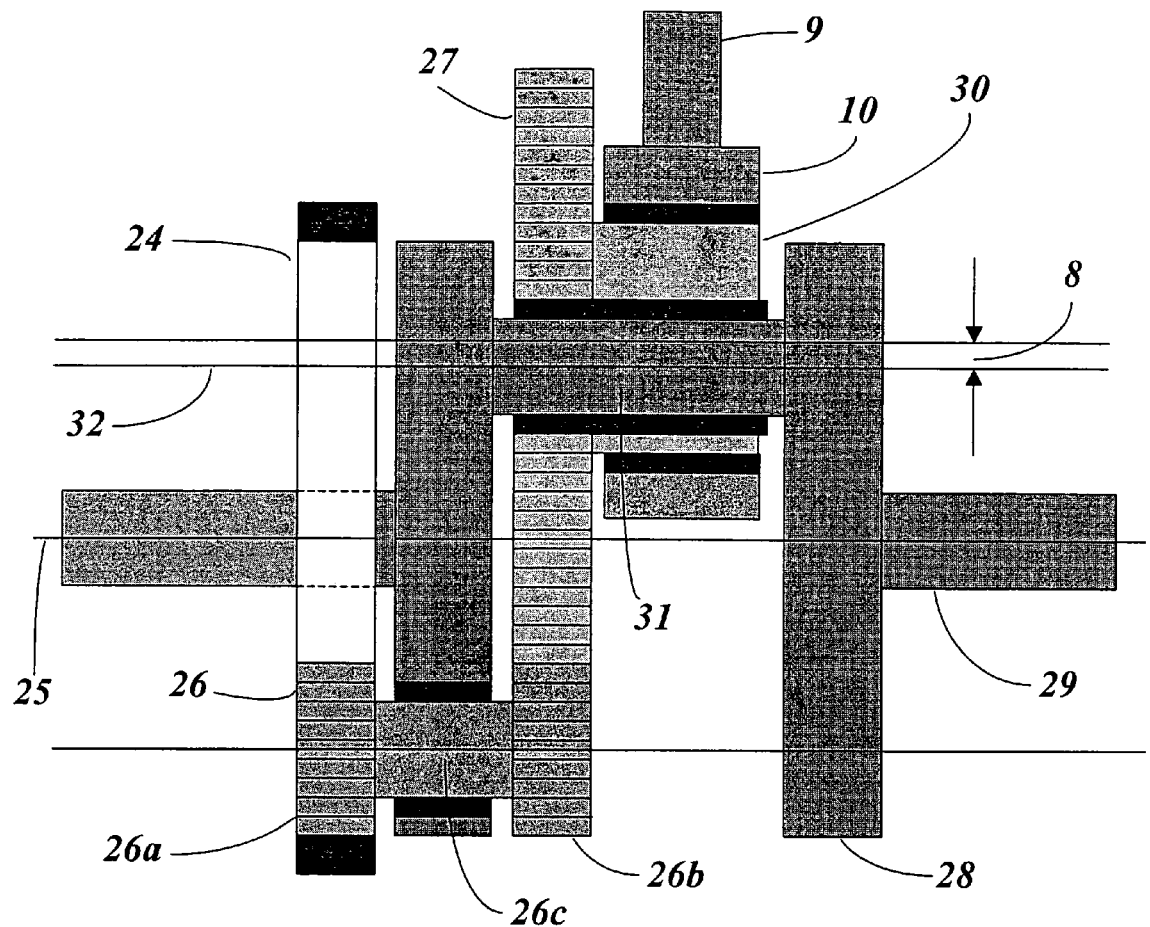
FIG. 13 is a cross section of an alternative Epitrochoidal crankshaft.
Figure 14:
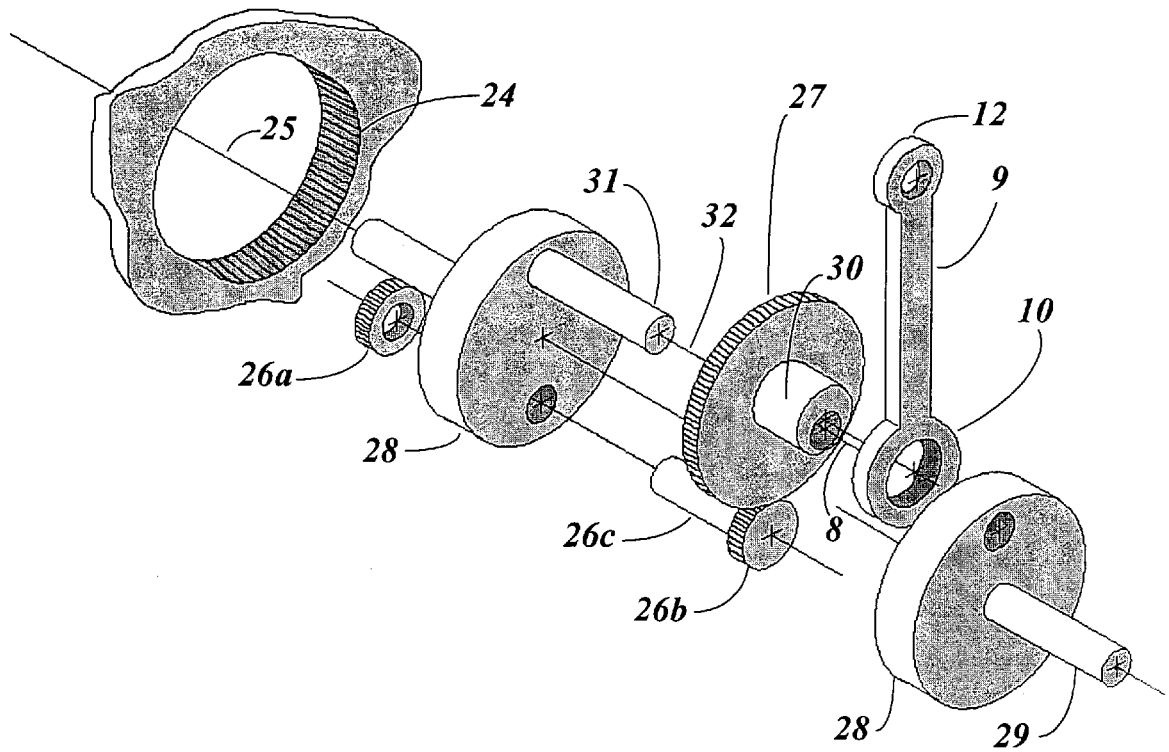
FIG. 14 is an exploded view of an alternative Epitrochoidal crankshaft.

However, there are alternative methods of generating an Epitrochoidal path that will allow the lower end of the connecting rod to move in the same manner as the original prototype two-gear design. A cross section of an alternative second embodiment is depicted in FIG. 13 and FIG. 14 illustrates an exploded perspective view of this second embodiment. Although the mechanical train is different, the same Epitrochoidal pattern is produced, and the theory behind the Epitrochoidal design remains the same. This second embodiment utilizes three gears. Two are conventional spur gears and the other is an internal toothed gear fixedly mounted to the crankcase. In order for the gearing to produce the desired pattern, the ratios between the gears' pitch diameters must be held to a 3 to 1 to 3 ratio. The stationary gear is the internal toothed gear 24 and is mounted such that its geometric axis 25 is the same as the axis of the crankshaft 29—they share the same centerline. The internal toothed gear 24 must have three times the pitch diameter of the next gear in the train, the smaller spur gear 26. Using the dimensions from the inventive prototype engine as an example, the internal toothed gear 24 has a pitch diameter of 1.6875 inches. The second gear 26 is a conventional spur gear with one-third the pitch diameter as the internal gear 24, so it must have a pitch diameter of 0.5625 inches. Its pitch diameter is equal to one-half of the crankshaft's stroke, so in this example, the crankshaft stroke would be 1.125 inches, the same as the inventive prototype's stroke. The second gear 26 will be mounted such that its teeth will mesh with the internal toothed gear 24. It will travel in a circular path within the internal gear 24. Every revolution that its center travels around the central axis of the internal toothed gear 24 will cause it to rotate twice on its own axis.

Figure 11:
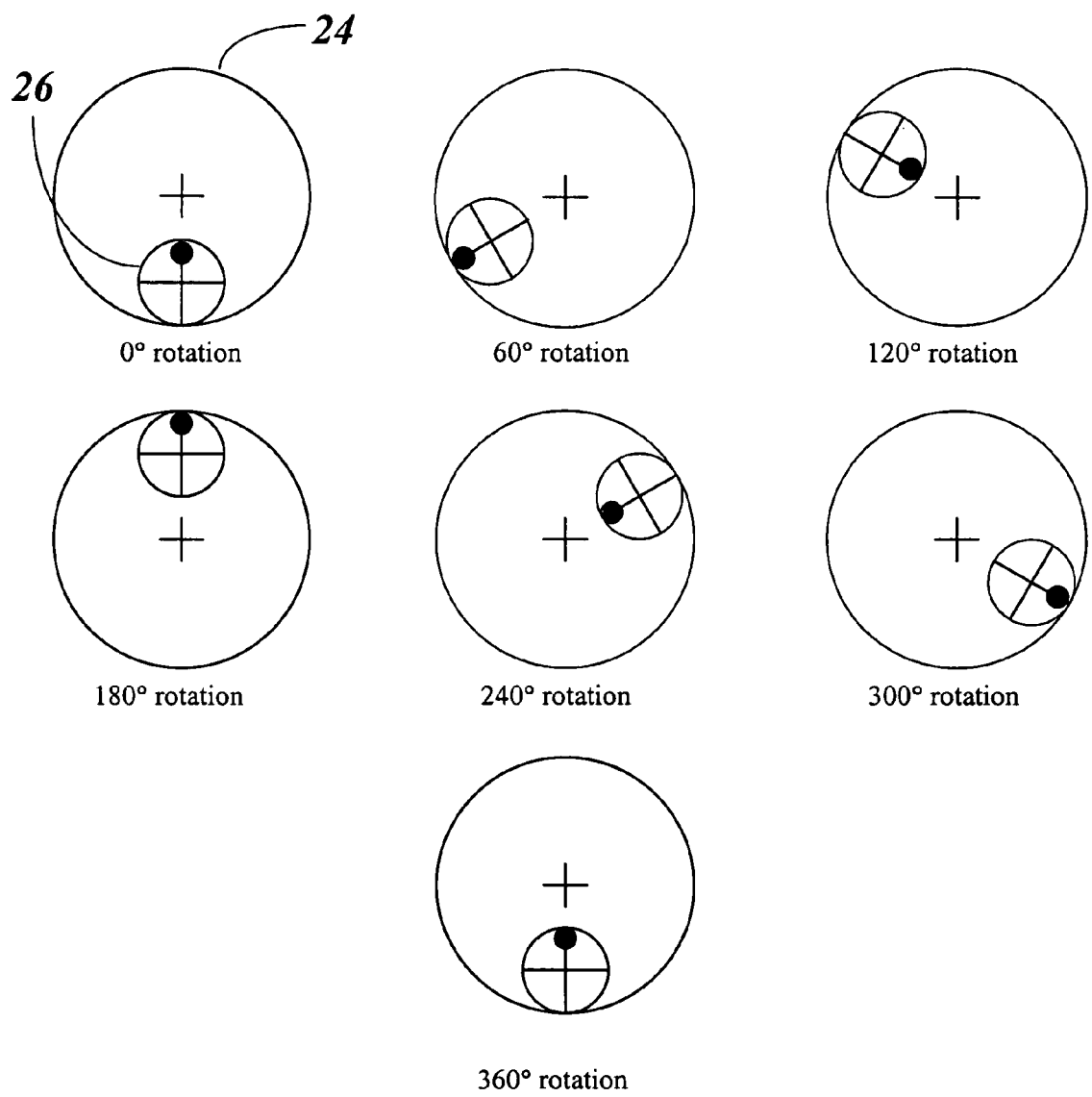
FIG. 11 graphically depicts the relative location of two gears in an alternative Epitrochoidal crankshaft during 360-degrees of crankshaft rotation.

FIG. 11 depicts two gears; the internal toothed gear 24 and the smaller spur gear 26, and their relationship as the small gear 26 rotates and revolves within the internal toothed gear 24. For clarity, the gear teeth are not shown. Rather, the pitch diameter is depicted. Also, a reference spot on the smaller spur gear 26 shows the position of the gear 26 at the various points of rotation. In this depiction, the smaller spur gear 26 is starting at the bottom of the internal toothed gear 24 and its reference spot begins on top of the smaller gear 26. The gear's center will be traveling clockwise, which will cause the smaller spur gear 26 to rotate on its axis in a counter-clockwise manner within the internal toothed gear 24. The motion of the reference spot also depicts that the smaller spur gear 26 rotates twice on its axis during a single revolution within the internal toothed gear 24.

Figure 12:
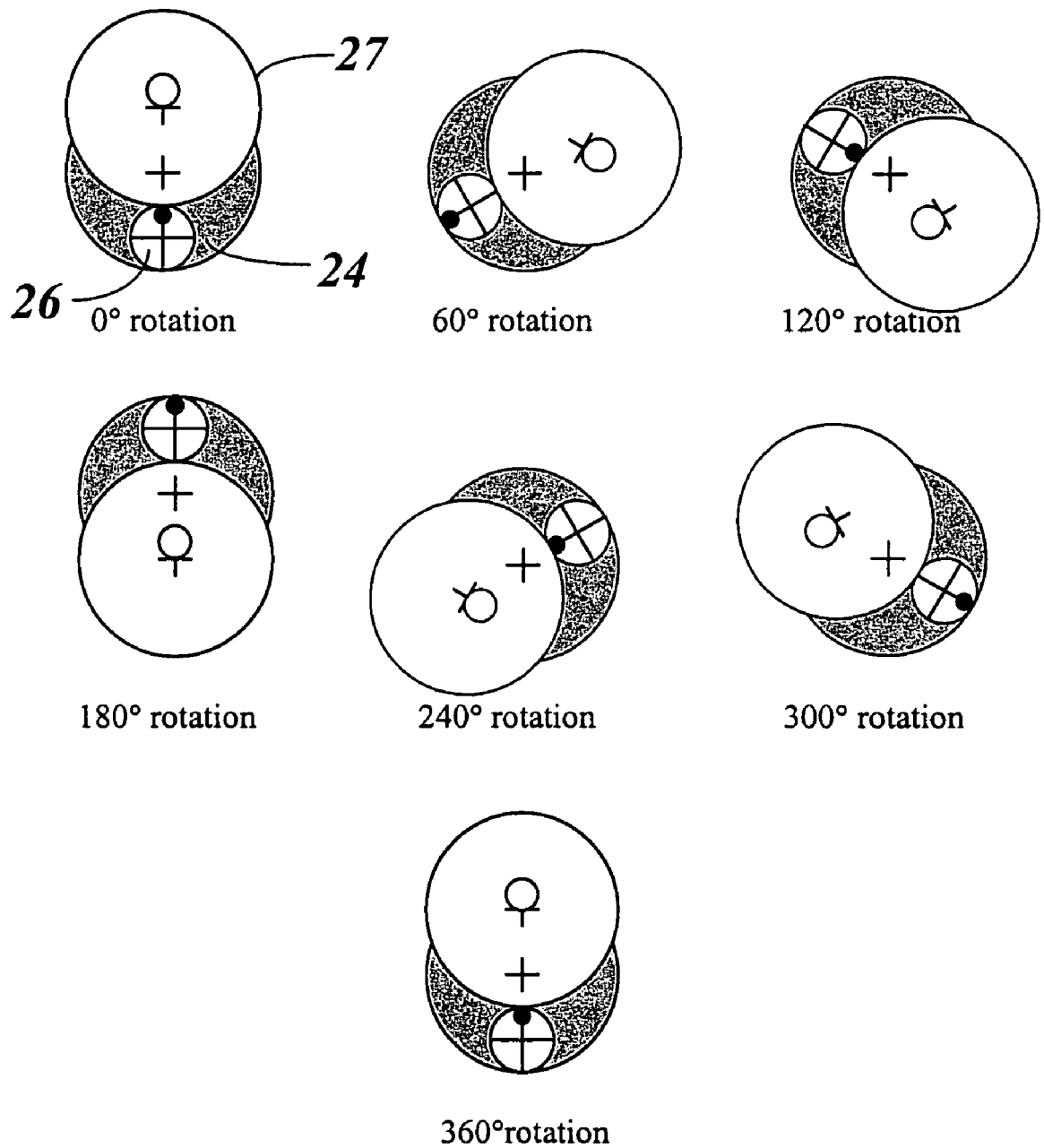
FIG. 12 graphically depicts the relative location of all elements in an alternative Epitrochoidal crankshaft during 360 degrees of crankshaft rotation.

The third larger spur gear 27 must have a pitch diameter 3 times the size of the smaller spur gear 26, so it must have a pitch diameter of 1.6875 inches. This larger spur gear 27 is of conventional gear design with its teeth on the outer circumference. Its geometric center will be the same as the axis 32 of the crankpin 31. Since the internal toothed gear 24 and the larger spur gear 27 have the same pitch diameter, physical size demands the two gears be mounted in two parallel planes, with the smaller spur 26 gear meshed with both. Since these depictions are drawn on one plane, the internal toothed gear 24 in FIG. 12 is shown in a darker color to denote it is below the plane of both the smaller gear 26 and the larger spur gear 27. To insure the gear train is kept intact, the small 0.5625 inch gear 26 discussed previously is actually two gears: One 26a is meshed with the internal toothed gear 24 in the lower plane and the second 26b is meshed with the larger spur gear 27 in the upper plane. The two smaller spur gears 26a and 26b are connected via a common shaft 26c. The common shaft 26c will be fixed in its location by mounting it in a bearing through one of the crank wheels 28. Such an arrangement will keep the small gear 26 in mesh with both the internal toothed gear 24 and the larger spur gear 27 at all times. As the center of the larger spur gear 27 rotates around the central axis 25 of the crankshaft 29 in a clockwise direction, the smaller spur gear 26, being in mesh with it, will cause the larger spur gear 27 to revolve in the same direction as its travel, which is depicted as clockwise. Note that the larger spur gear 27 rotates twice on its axis as its center travels once around the center 25 of the crankshaft. This motion is identical to the motion of the moving planet gear 3 in the first embodiment of the prototype inventive engine shown in FIG. 1. The larger spur gear 27 is attached to an eccentric bearing 30 in a manner similar to the first embodiment. Since the gear's diameter is much larger than in the first embodiment, the crankpin 31 can be a relatively large diameter, which can increase the load bearing area for the bearings. This diameter will not cause the crankpin 31 to be marginal in size, nor will the gear 27 have marginal material below the gear teeth roots. The gear 27 will still rotate in the same manner as in the first embodiment, and the offset distance 8 associated with the eccentric bearing 30 will be identical to the original calculation.

In FIG. 12, all components needed to generate the epitrochoid pattern are displayed. The crankshaft crank wheels 28, which would locate the centers of the gears in bearings, have not been depicted so that the relationship of the components that generate the epitrochoid pattern can be seen as they interact.

Figure 15:
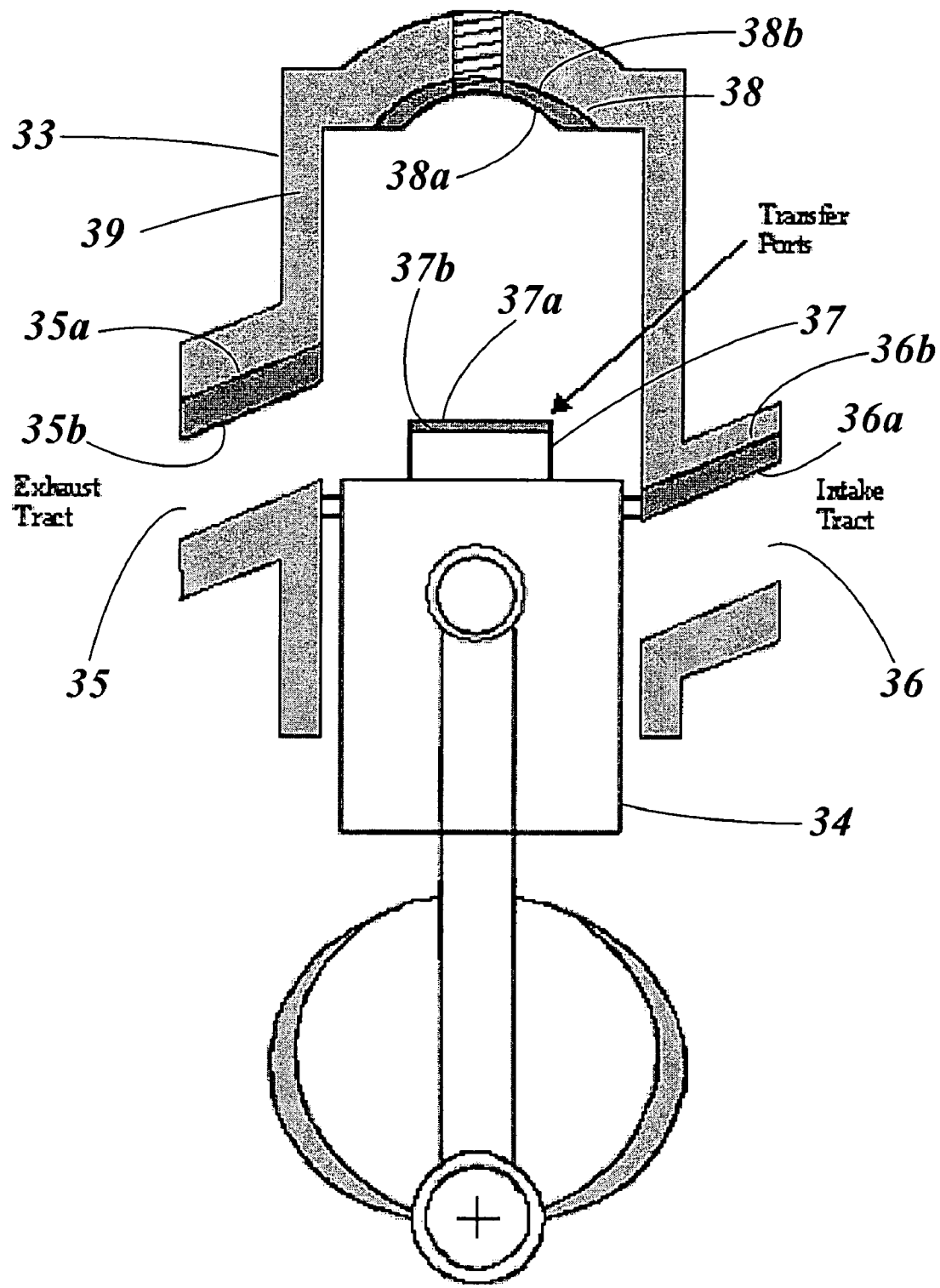
FIG. 15 is a cross section of a two-stroke cycle engine with piston at BDC showing alternative port positions.
Figure 16:
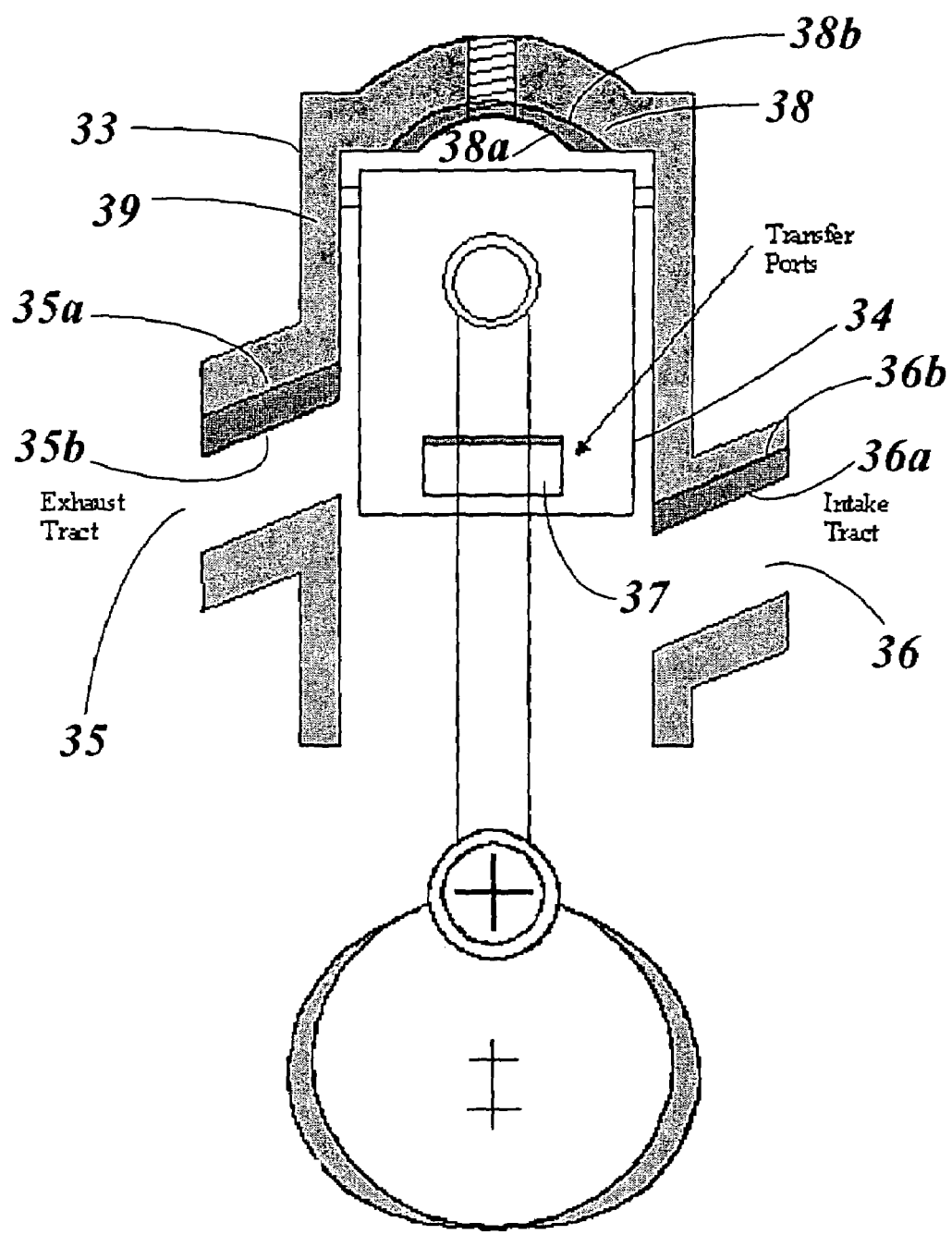
FIG. 16 is a cross section of a two-stroke cycle engine with piston at TDC showing alternative port positions.

FIG. 15 depicts a two stroke cycle engine 33 with cylindrical housing 39 with fixed ports while the piston 34 is located at BDC, and FIG. 16 depicts a two stroke cycle engine 33 with fixed ports while the piston 34 is located at TDC. These figures depict the differences in the standard engine's exhaust ports 35, intake ports 36, and transfer ports 37. As shown, the height 35a of the exhaust ports 35 and height 37a of the transfer ports 37 in the standard engine are lowered to height 35b and 37b in the prototype inventive engine to maintain the proper TA values in their respective tracts, and height 36a of the intake port tract 36 in the standard engine is raised to height 36b in the prototype engine. These differences in height are caused by the different speeds of the piston 34 during its travel within the cylinder, and the enhanced dwell period. Since the piston 34 is moving faster in the upper reaches of the cylinder, the available time for the intake port 36 is reduced and therefore requires more area to achieve the proper TA figure. On the other hand, the exhaust ports 35 and transfer ports 37 can be lowered since the piston 34 dwells at or near BDC. The lower port window is necessary for the TA value of the port to be maintained, but this aspect also provides a larger fuel mixture volume to be trapped in the cylinder during the next compression and power phase. Since more fuel mixture is trapped, the cylinder head volume must be increased to maintain the original CR. The cylinder head 38 must be enlarged from the chamber outline 38a for a standard engine to the outline 38b for the prototype engine to acquire the increased volume necessary, which also adds to the total volume of the trapped mixture charge.

I claim:

1. In a machine with at least one cylindrical housing with a central axis having at least one reciprocating piston traveling in the cylindrical housing along the central axis between a top dead center position and a bottom dead center position, a crankshaft rotatably mounted in a crankcase in said machine for rotation about a crank axis with at least one crankpin radially disposed on said crankshaft and having a crankpin axis parallel to the crank axis, and a connecting rod with an upper end pivotally attached to said piston at an upper end journal and a lower end pivotally attached to said crankpin at a lower end journal, said upper end pivoting about an upper end journal axis parallel to said crank axis and said lower end pivoting about a lower end journal axis parallel to said crank axis; a mechanism comprising an eccentric bearing with an axially eccentric journal having an eccentric journal axis parallel to the lower end journal axis and offset from the crankpin axis, said eccentric bearing interposed between the lower end and crankpin to generate a noncircular path for the lower end during rotation of the crankshaft in the crankcase.

2. A machine according to claim 1 wherein said noncircular path of the lower end of a connecting rod is an epitrochoid.

3. A machine according to claim 2 where said epitrochoid path extends the time spent by the piston dwelling at bottom dead center position in the cylindrical housing during rotation of the crankshaft in the crankcase.

4. A machine according to claim 3 wherein the distance between the upper and journal axis and the lower end journal axis is the radius of an arc which matches a lower portion of the epitrochoidal path during the time spent by the piston dwelling at bottom dead center position in the cylindrical housing during rotation of the crankshaft in the crankcase.

5. A machine according to claim 3 further comprising;
at least one planetary gear set including at least one stationary sun gear fixedly attached to the crankcase with a sun gear axis in line with the crank axis,
a revolving planet gear with a planet gear axis parallel to the sun gear axis and in mesh with the sun gear and of pitch diameter equal to the sun gear,
the eccentric bearing mounted to the planet gear with the eccentric journal axis parallel to the planet gear axis and offset from the planet gear axis,
said eccentric bearing rotatably mounted in the lower end journal, and the crankpin rotatably mounted in the eccentric journal.

6. A machine according to claim 3 further comprising;
at least one internal toothed gear fixedly mounted to the crankcase with said internal toothed gear having an axis in line with the crank axis,
at least one first spur gear with a first spur gear axis parallel to the axis of the internal toothed gear and in mesh with the internal toothed gear,
at least one second spur gear with a second spur gear axis parallel to the axis of the first spur gear and in mesh with the first spur gear,
the eccentric bearing mounted to the second spur gear with the eccentric journal axis parallel to the second spur gear axis end offset from the second spur gear axis,
said eccentric bearing rotatably mounted in the lower end journal, and the crankpin rotatably mounted in the eccentric journal.

7. A machine according to claim 3 wherein the machine operates according to a two stroke cycle.

8. A machine according to claim 5 wherein the machine operates according to a two stroke cycle.

9. A machine according to claim 6 wherein the machine operates according to a two stroke cycle.

10. A machine according to claim 3 wherein the machine operates according to a four stroke cycle.

11. A machine according to claim 5 wherein the machine operates according to a four stroke cycle.

12. A machine according to claim 6 wherein the machine operates according to a four stroke cycle.

13. A machine according to claim 4 further comprising;
at least one planetary gear set including at least one stationary sun gear fixedly attached to the crankcase with a sun gear axis in line with the crank axis, a revolving planet gear with a planet gear axis parallel to the sun gear axis and in mesh with the sun gear and of pitch diameter equal to the sun gear, the eccentric bearing mounted to the planet gear with the eccentric journal axis parallel to the planet gear axis and offset from the planet gear axis, said eccentric bearing rotatably mounted in the lower end journal, and the crankpin rotatably mounted in the eccentric journal.

14. A machine according to claim 4 further comprising;

at least one internal toothed gear fixedly mounted to the crankcase with said internal toothed gear having an axis in line with the crank axis, at least one first spur gear with a first spur gear axis parallel to the axis of the internal toothed gear and in mesh with the internal toothed gear, at least one second spur gear with a second spur gear axis parallel to the axis of the first spur gear and in mesh with the first spur gear, the eccentric bearing mounted to the second spur gear with the eccentric journal axis parallel to the second spur gear axis and offset from the second spur gear axis, said eccentric bearing rotatably mounted in the lower end journal, and the crankpin rotatably mounted in the eccentric journal.

15. A machine according to claim 4 wherein the machine operates according to a two stroke cycle.

16. A machine according to claim 13 wherein the machine operates according to a two stroke cycle.

17. A machine according to claim 14 wherein the machine operates according to a two stroke cycle.

18. A machine according to claim 4 wherein the machine operates according to a four stroke cycle.

19. An improved machine according to claim 13 wherein the machine operates according to a four stroke cycle.

20. A machine according to claim 14 wherein the machine operates according to a four stroke cycle.

21. A method of enhancing the performance of a machine with at least one cylindrical housing with a central axis having at least one reciprocating piston traveling in the cylindrical housing along the central axis between a top dead center position and a bottom dead center position, a crankshaft rotatably mounted in a crankcase in said machine for rotation about a crank axis with at least one crankpin radially disposed on said crankshaft and having a crankpin axis parallel to the crank axis. and a connecting rod with an upper end pivotally attached to said piston at an upper end journal and a lower end pivotally attached to said crankpin at a lower end journal said upper end pivoting about an upper end journal axis parallel to said crank axis and said lower end pivoting about a lower end journal axis parallel to said crank axis comprising the steps of providing an eccentric bearing with an axially eccentric journal and eccentric journal axis parallel to the lower end journal axis.

placing said eccentric bearing in the lower end journal, placing the crankpin in the eccentric journal where the eccentric bearing journal axis is parallel to and offset from the crankpin axis, causing the lower end to follow a noncircular path during rotation of the crankshaft in the crankcase wherein said noncircular path is an epitrochoid and said epitrochoid path extends the time spent by the piston dwelling at bottom dead center position in the cylindrical housing during rotation of the crankshaft in the crankcase.

22. The method of claim 21 wherein the distance between to upper end journal axis and the lower end journal axis is the radius of an arc which matches a lower portion of the epitrochoidal path during the time spent by the piston dwelling at bottom dead center position in to cylindrical housing during rotation of the crankshaft in the crankcase.

23. The method of claim 21, further comprising the steps of providing at least one planetary gear set including at least one stationary sun gear fixedly attached to the crankcase with a sun gear axis in line with the crank axis, providing a revolving planet gear with a planet gear axis parallel to the sun gear axis and in mesh with the sun gear and of pitch diameter equal to the sun gear, mounting an eccentric bearing to the planet gear with the eccentric journal axis parallel to the planet gear axis and offset from the planet gear axis, and rotatably mounting said eccentric bearing in the lower end journal, and rotatably mounting the crankpin in the eccentric journal.

24. The method of claim 21, further comprising the steps of providing at least one internal toothed gear fixedly mounted to the crankcase with said internal toothed gear having an axis in line with the crank axis, providing at least one first spur gear with a first spur gear axis parallel to the axis of the internal toothed gear and in mesh with the internal toothed gear, providing at least one second spur gear with a second spur gear axis parallel to the axis of the first spur gear and in mesh with the first spur gear, mounting the eccentric bearing to the second spur gear with the eccentric journal axis parallel to the second spur gear axis and offset from the second spur gear axis, rotatably mounting said eccentric bearing in the lower end journal, and rotatably mounting the crankpin in the ecceniric journal.

25. The method of claim 22, further comprising the steps of providing at least one planetary gear set including at least one stationary sun gear fixedly attached to the crankcase with a sun gear axis in line with the crank axis, providing a revolving planet gear with a planet gear axis parallel to the sun gear axis and in mesh with the sun gear and of pitch diameter equal to the sun gears mounting an eccentric bearing to the planet gear with the eccentric journal axis parallel to the planet gear axis and offset from the planet gear axis, and rotatably mounting said eccentric bearing in the lower end journal, and rotatably mounting the crankpin in the eccentric journal.

26. The method of claim 22, further comprising the steps of providing at least one internal toothed gear fixedly mounted to the crankcase with said internal toothed gear having an axis in line with the crank axis, providing at least one first spur gear with a first spur gear axis parallel to the axis of the internal toothed gear and in mesh with the internal toothed gear, providing at least one second spur gear with a second spur gear axis parallel to the axis of the first spur gear and in mesh with the first spur gear, mounting the eccentric bearing to the second spur gear with the eccentric journal axis parallel to the second spur gear axis and offset from the second spur gear axis, rotatably mounting said eccentric bearing in the lower end journal, and rotatably mounting the crankpin in the eccentric journal.

27. The method of claim 21 wherein the machine operates according to a two stroke cycle.

28. The method of claim 23 wherein the machine operates according to a two stroke cycle.

29. The method of claim 24 wherein the machine operates according to a two stroke cycle.

30. The method of claim 21 wherein the machine operates according to a four stroke cycle.

31. The method of claim 23 wherein the machine operates according to a four stroke cycle.

32. The method of claim 24 wherein the machine operates according to a four stroke cycle.

33. The method of claim 22 wherein the machine operates according to a two stroke cycle.

34. The method of claim 25 wherein the machine operates according to a two stroke cycle.

35. The method of claim 26 wherein the machine operates according to a two stroke cycle.

36. The method of claim 22 wherein the machine operates according to a four stroke cycle.

37. The method of claim 25 wherein the machine operates according to a four stroke cycle.

38. The method of claim 26 wherein the machine operates according to a four stroke cycle.

39. The method of claim 21 where the machine has at least one fixed exhaust port in the cylindrical housing, further comprising the step of resizing and relocating the exhaust port along the axis of the cylindrical housing.

40. The method of claim 21 where the machine has at least one fixed intake port in the cylindrical housing, further comprising the step of resizing and relocating the intake port along the axis of the cylindrical housing.

41. The method of claim 22 where the machine has at least one fixed exhaust port in the cylindrical housing, further comprising the step of resizing and relocating the exhaust port along the axis of the cylindrical housing.

42. The method of claim 22 where the machine has at least one fixed intake port in the cylindrical housing further comprising the step of resizing and relocating the intake port along the axis of the cylindrical housing.

43. The method of claim 39 wherein the machine operates according to a two stroke cycle.

44. The method of claim 39 wherein the machine operates according to a four stroke cycle.

45. The method of claim 40 wherein the machine operates according to a two stroke cycle.

46. The method of claim 40 wherein the machine operates according to a four stroke cycle.

47. The method of claim 41 wherein the machine operates according to a two stoke cycle.

48. The method of claim 41 wherein the machine operates according to a four stroke cycle.

49. The method of claim 42 wherein the machine operates according to a two stroke cycle.

50. The method of claim 42 wherein the machine operates according to a four stroke cycle.

* * * * *